United States Patent
Yamasaki

(10) Patent No.: US 9,197,334 B2
(45) Date of Patent: Nov. 24, 2015

(54) RADIO SIGNAL RECEIVER UNIT AND SIGNAL PROCESSING UNIT

(75) Inventor: Ryota Yamasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 36 days.

(21) Appl. No.: 14/351,923

(22) PCT Filed: Jul. 25, 2012

(86) PCT No.: PCT/JP2012/068753
§ 371 (c)(1),
(2), (4) Date: Apr. 15, 2014

(87) PCT Pub. No.: WO2013/065366
PCT Pub. Date: May 10, 2013

(65) Prior Publication Data
US 2014/0256275 A1    Sep. 11, 2014

(30) Foreign Application Priority Data

Oct. 31, 2011   (JP) ................................. 2011-238169

(51) Int. Cl.
*H04B 17/00*     (2015.01)
*H04B 1/10*      (2006.01)
(Continued)

(52) U.S. Cl.
CPC .......... *H04B 17/0042* (2013.01); *H04B 1/1027* (2013.01); *H04B 17/24* (2015.01); *H04B 17/309* (2015.01)

(58) Field of Classification Search
CPC .................................................. H04B 17/0042
USPC ....................................... 455/226.1; 375/150
See application file for complete search history.

(56) References Cited

U.S. PATENT DOCUMENTS

| 6,529,547 | B1 | 3/2003 | Alexander et al. |
| 2001/0017904 | A1* | 8/2001 | Pukkila et al. ................. 375/350 |

(Continued)

FOREIGN PATENT DOCUMENTS

| JP | 2000-514610 A | 10/2000 |
| JP | 2007-295455 A | 11/2007 |

(Continued)

*Primary Examiner* — Sanh Phu
(74) *Attorney, Agent, or Firm* — Miles & Stockbrige PC

(57) ABSTRACT

The present invention provides a mechanism for recording only a received radio signal conforming to recording conditions and discarding a received radio signal not conforming to the recording conditions. The radio communication unit includes:

(a) a signal detector for detecting a feature quantity of a received radio signal;
(b) a signal-reception processing unit for inputting a received radio signal to be input to the signal detector or a received radio signal that has been output from the signal detector to demodulate the received radio signal;
(c) a data judgment unit for determining whether the received radio signal demodulated by the signal-reception processing unit is correct or incorrect and/or for determining the characteristics of the received radio signal demodulated by the signal-reception processing unit;
(d) a condition setting section for inputting recording conditions of the received radio signal; and
(e) a signal judgment unit for:
inputting feedback signals from the signal detector, the signal-reception processing unit, and the data judgment unit;
using at least a part of the feedback signals to determine whether the received radio signal conforms to the recording conditions; and
controlling the received radio signal prior to signal processing to be recorded into a signal recording unit on the basis of a result of the determination.

14 Claims, 28 Drawing Sheets

(51) Int. Cl.
   *H04B 17/24*        (2015.01)
   *H04B 17/309*       (2015.01)

(56) References Cited

U.S. PATENT DOCUMENTS

| 2003/0012306 | A1  | 1/2003 | Alexander et al. | |
| 2007/0166003 | A1* | 7/2007 | Herz et al. | 386/83 |
| 2009/0180525 | A1* | 7/2009 | Kobayashi et al. | 375/150 |
| 2010/0325505 | A1* | 12/2010 | Shimezawa et al. | 714/748 |
| 2010/0333148 | A1* | 12/2010 | Musha et al. | 725/81 |

FOREIGN PATENT DOCUMENTS

| JP | 2010-245817 A | 10/2010 |
| JP | 2013-042352 A | 2/2013 |

* cited by examiner

F I G. 1
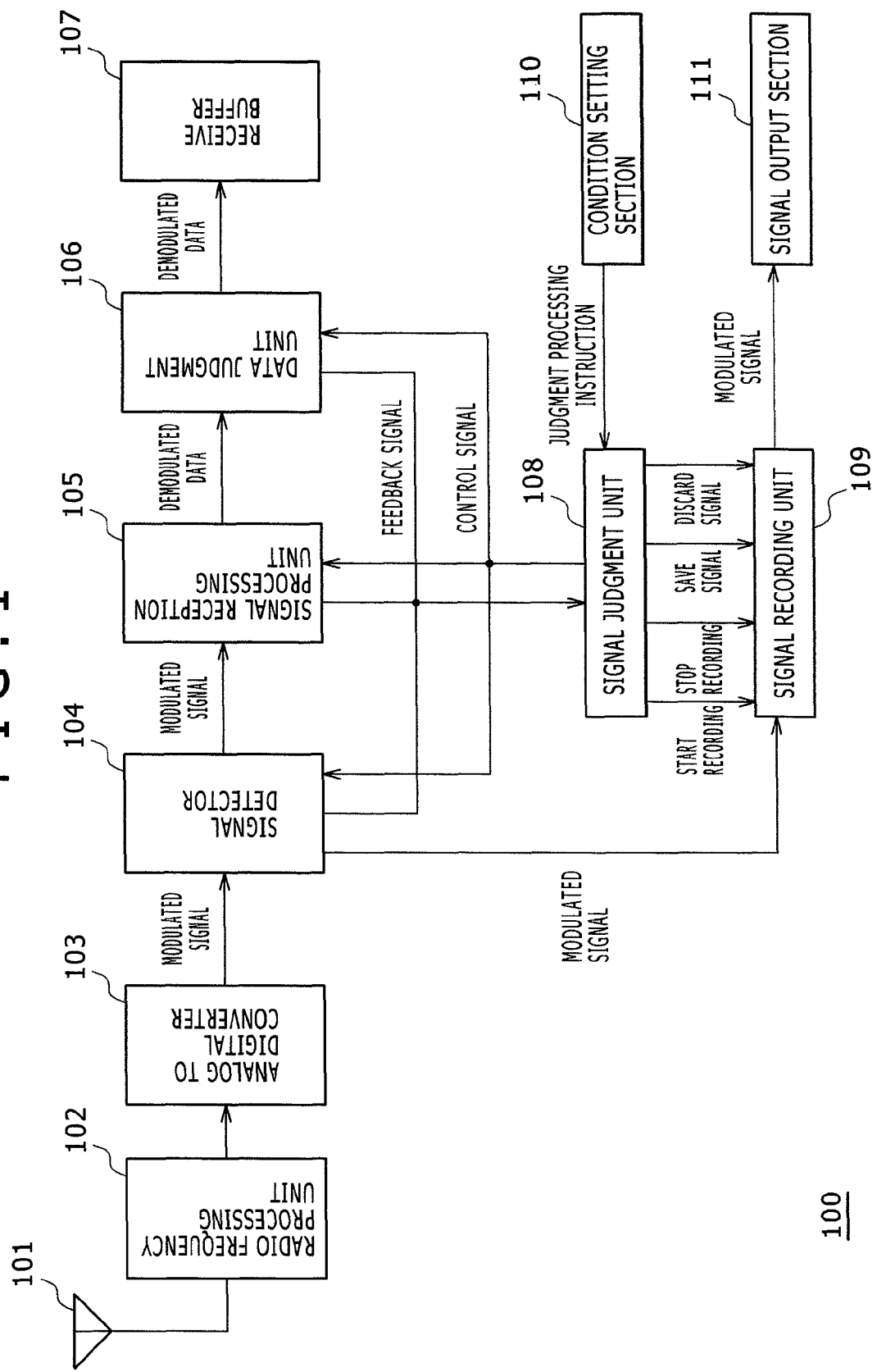

FIG.14

| SET ITEMS | SET VALUES |
|---|---|
| POWER DETECTION ON/OFF | ON |
| POWER THRESHOLD VALUE | -70 dBm |
| FREQUENCY DETECTION ON/OFF | ON |
| CENTER FREQUENCY | 2450 MHz |
| BANDWIDTH | 5 MHz |
| CORRELATION DETECTION ON/OFF | OFF |
| CORRELATION PATTERN | NONE |
| SYNCHRONIZATION PROCESSING ON/OFF | OFF |
| PROCESSING THRESHOLD VALUE | NONE |
| EQUALIZATION PROCESSING ON/OFF | OFF |
| PROCESSING THRESHOLD VALUE | NONE |
| DEMODULATION PROCESSING ON/OFF | OFF |
| PROCESSING THRESHOLD VALUE | NONE |
| DECODING PROCESSING ON/OFF | OFF |
| PROCESSING THRESHOLD VALUE | NONE |
| DATA ERROR JUDGMENT ON/OFF | ON |
| NORMALITY DETECTION/ABNORMALITY DETECTION  ABNORMALITY DETECTION | ERROR DETECTION |
| DATA-CHARACTERISTIC JUDGMENT ON/OFF | ON |
| COMMUNICATION PERIOD | 500ms |

| | BROAD BAND | | NARROW BAND | |
|---|---|---|---|---|
| ELECTROMAGNETIC WAVE TYPE / GENERATION SOURCE | DISCHARGE | PULSE SIGNAL | SPURIOUS HARMONICS | INDUCTION |
| RADIO SYSTEM | | ○ | ○ | |
| HARMONICS-USED EQUIPMENT | | | ○ | ○ |
| ELECTRONIC EQUIPMENT | ○ | ○ | ○ | |
| ILLUMINATION EQUIPMENT | ○ | ○ | | |
| MEDICAL EQUIPMENT | ○ | | ○ | |
| POWER SYSTEM | ○ | ○ | ○ | ○ |

FIG.19

| SET ITEMS | SET VALUES |
|---|---|
| POWER DETECTION ON/OFF | ON |
| POWER THRESHOLD VALUE | -80 dBm |
| FREQUENCY DETECTION ON/OFF | ON |
| CENTER FREQUENCY | 2450 MHz |
| BANDWIDTH | 5 MHz |
| CORRELATION DETECTION ON/OFF | ON |
| CORRELATION PATTERN | SELF CORRELATION |
| SYNCHRONIZATION PROCESSING ON/OFF | OFF |
| PROCESSING THRESHOLD VALUE | NONE |
| EQUALIZATION PROCESSING ON/OFF | OFF |
| PROCESSING THRESHOLD VALUE | NONE |
| DEMODULATION PROCESSING ON/OFF | OFF |
| PROCESSING THRESHOLD VALUE | NONE |
| DECODING PROCESSING ON/OFF | OFF |
| PROCESSING THRESHOLD VALUE | NONE |
| DATA ERROR JUDGMENT ON/OFF | ON |
| NORMALITY DETECTION/ABNORMALITY DETECTION | NORMALITY DETECTION |
| DATA-CHARACTERISTIC JUDGMENT ON/OFF | ON |
| COMMUNICATION PERIOD | 500ms |

FIG.22

| SET ITEMS | SET VALUES |
|---|---|
| POWER DETECTION ON/OFF | ON |
| POWER THRESHOLD VALUE | -70 dBm |
| FREQUENCY DETECTION ON/OFF | ON |
| CENTER FREQUENCY | 2450 MHz |
| BANDWIDTH | 5 MHz |
| CORRELATION DETECTION ON/OFF | ON |
| CORRELATION PATTERN | SELF CORRELATION |
| SYNCHRONIZATION PROCESSING ON/OFF | OFF |
| PROCESSING THRESHOLD VALUE | NONE |
| EQUALIZATION PROCESSING ON/OFF | OFF |
| PROCESSING THRESHOLD VALUE | NONE |
| DEMODULATION PROCESSING ON/OFF | OFF |
| PROCESSING THRESHOLD VALUE | NONE |
| DECODING PROCESSING ON/OFF | OFF |
| PROCESSING THRESHOLD VALUE | NONE |
| DATA ERROR JUDGMENT ON/OFF | ON |
| NORMALITY DETECTION/ABNORMALITY DETECTION | ABNORMALITY DETECTION |
| DATA-CHARACTERISTIC JUDGMENT ON/OFF | OFF |
| COMMUNICATION PERIOD | NONE |

FIG.25

| SET ITEMS | SET VALUES |
|---|---|
| POWER DETECTION ON/OFF | ON |
| POWER THRESHOLD VALUE | -85 dBm |
| FREQUENCY DETECTION ON/OFF | ON |
| CENTER FREQUENCY | 2450 MHz |
| BANDWIDTH | 100 MHz |
| CORRELATION DETECTION ON/OFF | OFF |
| CORRELATION PATTERN | NONE |
| SYNCHRONIZATION PROCESSING ON/OFF | OFF |
| PROCESSING THRESHOLD VALUE | NONE |
| EQUALIZATION PROCESSING ON/OFF | OFF |
| PROCESSING THRESHOLD VALUE | NONE |
| DEMODULATION PROCESSING ON/OFF | OFF |
| PROCESSING THRESHOLD VALUE | NONE |
| DECODING PROCESSING ON/OFF | OFF |
| PROCESSING THRESHOLD VALUE | NONE |
| DATA ERROR JUDGMENT ON/OFF | OFF |
| NORMALITY DETECTION/ABNORMALITY DETECTION | NONE |
| DATA-CHARACTERISTIC JUDGMENT ON/OFF | OFF |
| COMMUNICATION PERIOD | NONE |

FIG.30

| SET ITEMS | SET VALUES |
|---|---|
| POWER DETECTION ON/OFF | ON |
| POWER THRESHOLD VALUE | -100 dBm |
| FREQUENCY DETECTION ON/OFF | ON |
| CENTER FREQUENCY | 1575 MHz |
| BANDWIDTH | 10 MHz |
| CORRELATION DETECTION ON/OFF | OFF |
| CORRELATION PATTERN | NONE |
| SYNCHRONIZATION PROCESSING ON/OFF | OFF |
| PROCESSING THRESHOLD VALUE | NONE |
| EQUALIZATION PROCESSING ON/OFF | OFF |
| PROCESSING THRESHOLD VALUE | NONE |
| DEMODULATION PROCESSING ON/OFF | OFF |
| PROCESSING THRESHOLD VALUE | NONE |
| DECODING PROCESSING ON/OFF | OFF |
| PROCESSING THRESHOLD VALUE | NONE |
| DATA ERROR JUDGMENT ON/OFF | OFF |
| NORMALITY DETECTION/ABNORMALITY DETECTION | NONE |
| DATA-CHARACTERISTIC JUDGMENT ON/OFF | OFF |
| COMMUNICATION PERIOD | NONE |

FIG. 33

| SET ITEMS | SET VALUES |
|---|---|
| POWER DETECTION ON/OFF | ON |
| POWER THRESHOLD VALUE | 30 dBm |
| FREQUENCY DETECTION ON/OFF | ON |
| CENTER FREQUENCY | 435 MHz |
| BANDWIDTH | 10 MHz |
| CORRELATION DETECTION ON/OFF | OFF |
| CORRELATION PATTERN | NONE |
| SYNCHRONIZATION PROCESSING ON/OFF | OFF |
| PROCESSING THRESHOLD VALUE | NONE |
| EQUALIZATION PROCESSING ON/OFF | OFF |
| PROCESSING THRESHOLD VALUE | NONE |
| DEMODULATION PROCESSING ON/OFF | OFF |
| PROCESSING THRESHOLD VALUE | NONE |
| DECODING PROCESSING ON/OFF | OFF |
| PROCESSING THRESHOLD VALUE | NONE |
| DATA ERROR JUDGMENT ON/OFF | OFF |
| NORMALITY DETECTION/ABNORMALITY DETECTION | NONE |
| DATA-CHARACTERISTIC JUDGMENT ON/OFF | OFF |
| COMMUNICATION PERIOD | NONE |

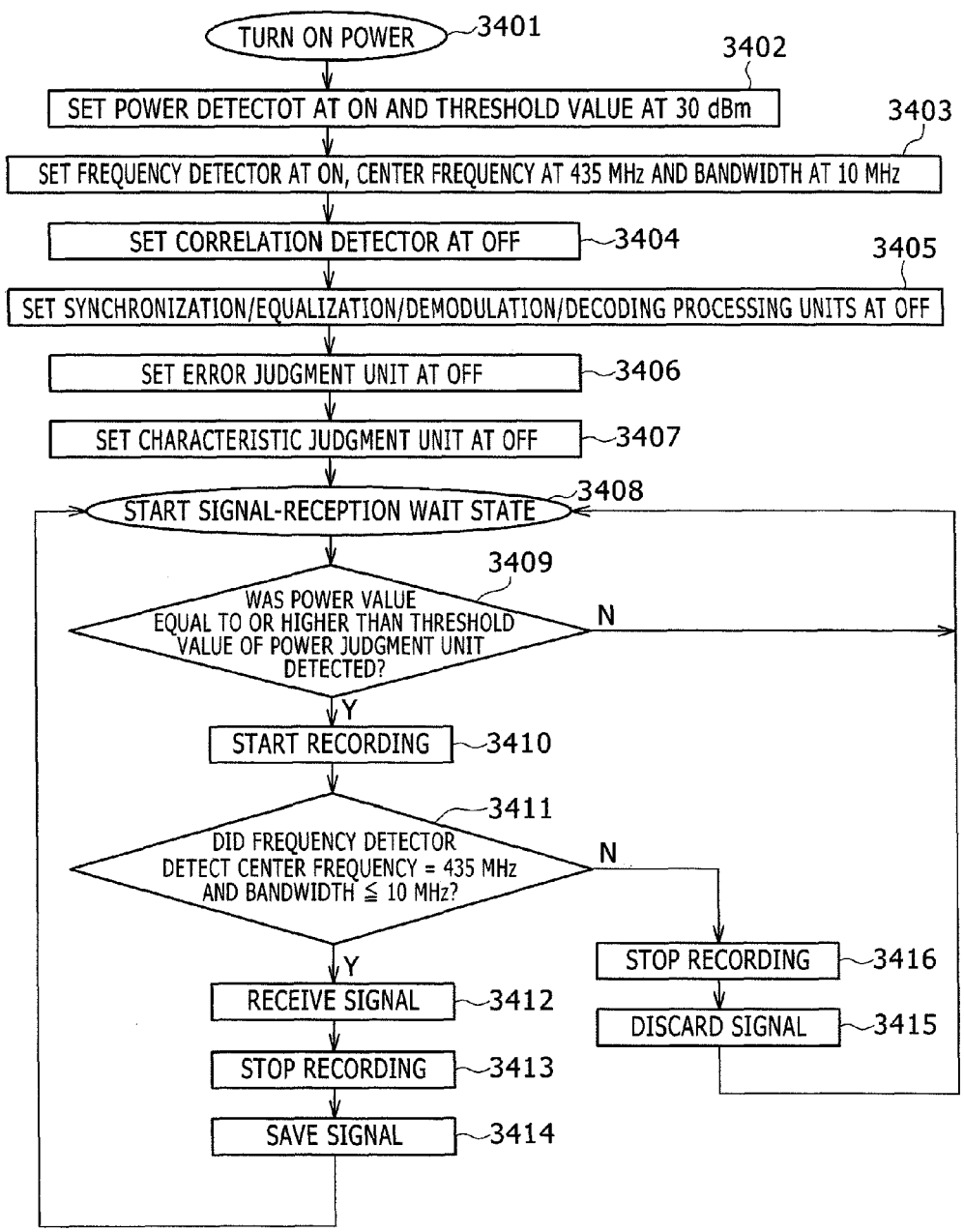

RADIO SIGNAL RECEIVER UNIT AND SIGNAL PROCESSING UNIT

TECHNICAL FIELD

The present invention relates to a radio signal receiver unit for receiving a radio signal and a signal processing unit for processing such a signal.

BACKGROUND ART

Patent document 1 is one of documents describing a technology for inferring the reception status of a radio signal with a high degree of precision. Patent document 1 describes a signal receiver unit capable of improving the precision of the inference of the reception status. The precision of inferring the reception status can be improved through use of a baseband signal (to put it concretely, a baseband signal obtained as a result of an equalization process but prior to a decoding process) which is obtained at a reception process.

PRIOR ART LITERATURE

Patent Document

Patent Document 1: JP-2010-245817-A

SUMMARY OF THE INVENTION

Problems to be Solved by the Invention

The signal receiver unit described in patent document 1 analyzes a baseband signal after an equalization process but prior to a decoding process and selectively acquires only baseband signals satisfying recording conditions. When the equalization process is carried out, however, the amplitude is attenuated and information such as phase distortions is undesirably lost. Thus, the technology described in patent document 1 is not always appropriate for applications to analyze the reception status of any arbitrary radio signal and communication status. For example, a method disclosed in patent document 1 is not appropriate for an application in which it is necessary to analyze the communication status on the basis of information indicating the presence/absence of an interference signal of the radio signal and information on the degree of attenuation of the amplitude and the degree of phase distortions.

For the reason described above, the inventor of the present invention proposes a technology making it possible to selectively gather judgment results in accordance with individual conditions depending on recording/saving purposes from any signal-reception processing stages and possible to selectively record a received radio signal proper for recording conditions on the basis of a combination of the gathered judgment results.

Means for Solving the Problems

The inventor of the present invention proposes a radio communication unit serving as an invention. The radio communication unit includes:

(a) a signal detector for detecting a feature quantity of a received radio signal;

(b) a signal-reception processing unit for inputting a received radio signal to be input to the signal detector or a received radio signal that has been output from the signal detector to demodulate the received radio signal;

(c) a data judgment unit for determining whether the received radio signal demodulated by the signal-reception processing unit is correct or incorrect and/or for determining the characteristics of the received radio signal demodulated by the signal-reception processing unit;

(d) a condition setting section for inputting recording conditions of the received radio signal; and (e) a signal judgment unit for:

inputting feedback signals from the signal detector, the signal-reception processing unit, and the data judgment unit;

using at least a part of the feedback signals to determine whether the received radio signal conforms to the recording conditions; and controlling the received radio signal prior to signal processing to be recorded into a signal recording unit on the basis of a result of the determination.

The inventor of the present invention proposes a signal processing unit serving as another invention. The signal processing unit includes a signal judgment unit for:

inputting feedback signals from a signal detector, signal-reception processing unit, and a data judgment unit;

using at least a part of the feedback signals to determine whether a received radio signal conforms to recording conditions; and controlling the received radio signal to be recorded into a signal recording unit on the basis of a result of the determination.

Advantages

According to the present invention, it is possible to selectively record only a radio signal matching recording conditions set in accordance with a radio signal serving as an object to be recorded. Problems other than those described above, other configurations, and other advantages will be elaborated in the following descriptions of an embodiment

BRIEF DESCRIPTION OF THE DRAWINGS

FIG. 1 is a diagram showing a typical functional structure of a radio communication unit.

FIG. 14 is a diagram showing typical setting conditions (recording conditions) supplied to the signal judgment unit.

FIG. 19 is a diagram showing typical setting conditions (recording conditions) supplied to the signal judgment unit.

FIG. 22 is a diagram showing typical setting conditions (recording conditions) supplied to the signal judgment unit.

FIG. 25 is a diagram showing typical setting conditions (recording conditions) supplied to the signal judgment unit.

FIG. 30 is a flowchart to be referred to in explanation of typical processing operations carried out in the signal judgment unit.

FIG. 33 is a diagram showing typical setting conditions (recording conditions) supplied to the signal judgment unit.

FIG. 34 is a flowchart to be referred to in explanation of typical processing operations carried out in the signal judgment unit.

MODES FOR CARRYING OUT THE INVENTION

Figure 2:
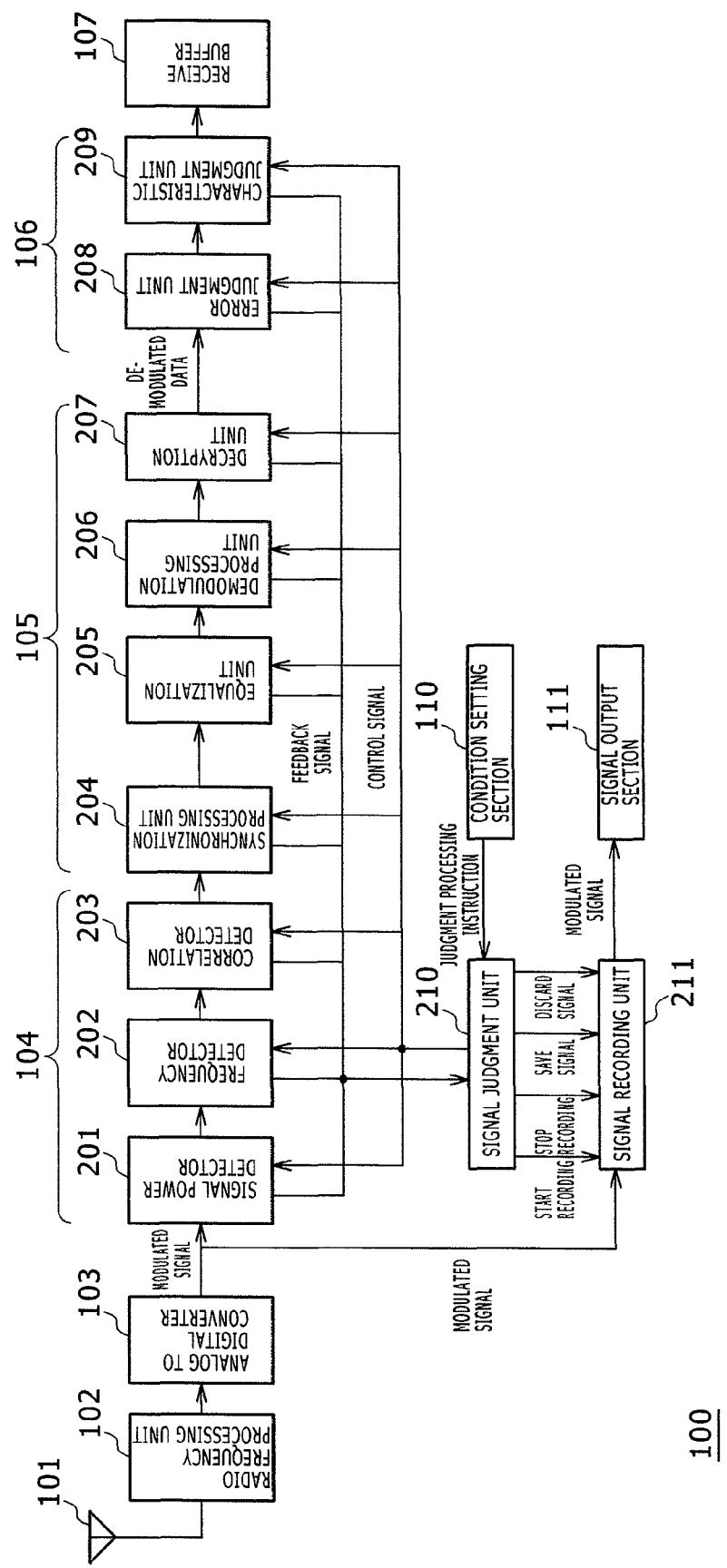
FIG. 2 is a diagram showing a typical detailed functional structure of a radio communication unit.

For the sake of convenience, when necessary, each embodiment is described below with the embodiment divided into a plurality of sections or multiple sub-embodiments. In the following description of each embodiment, specified element count (such as the number of units, a numerical value, a quantity, and a range) representing a specific quantity does not limit the specific quantity of the element. The specific quantity, however, may be smaller or greater than the element unless the specific quantity is clearly specified or is obviously restrained to certain number in principle. It is to be noted that, in the following description of each embodiment, structural elements (including processing steps) are not necessarily required unless the elements are described as essential or are clearly considered to be a mandatory element in principle.

For example, each structure, function, processing unit, and processing means in the embodiment described below can be implemented partially or entirely as an integrated circuit or another piece of hardware. As an alternative, each structure, function, processing unit, and processing means in the embodiment described below can also be implemented as a program executed on a computer. That is to say, each structure, each function, each processing unit, each processing means and each of other units can be implemented as a piece of software. Various kinds of information can be stored in a memory, a hard disk, a storage apparatus such as an SSD (Solid State Drive), or a storage medium such as an IC card, an SD card, and a DVD. Examples of the information are the programs, tables, and files implementing each structure, function, processing unit, and each processing means.

Embodiments of the present invention are explained below in detail with reference to the diagrams. It is to be noted that, in all the diagrams referred to in the explanation of the embodiments, members each having identical functions are denoted with the same reference numerals or related reference numerals. In addition, such members are explained only once in order to omit duplications of descriptions. On the top of that, as a general rule, identical or similar portions are explained only once unless the explanation of such a portion needs to be repeated in the following description of the embodiments.

First Embodiment

Apparatus Structure

FIG. 1 is a diagram showing a typical entire structure of a radio communication unit 100 according to an embodiment. The radio communication unit includes not only the so-called terminal apparatus but also a relay station apparatus and a base station apparatus. The radio communication unit described in this specification further includes a measurement apparatus used for inspections and analyses. The embodiment explained below implements a radio communication unit 100 which is capable of selectively recording any arbitrary radio signal matching conditions that a user arbitrarily enters to the radio communication unit 100.

The radio communication unit 100 shown in FIG. 1 is configured to include an antenna 101, a radio frequency processing unit 102, an, analog to digital converter 103, a signal detector 104, a signal-reception processing unit 105, a data judgment unit 106, a receive buffer 107, a signal judgment unit 108, a signal recording unit 109, condition setting section 110, and a signal output section 111.

The antenna 101 is an antenna for receiving a radio signal. The radio frequency processing unit 102 is a radio frequency processing circuit for amplifying a received radio signal (a radio signal received by the antenna 101) and carrying out down-conversion on the signal to a baseband band. The analog to digital converter 103 is a circuit for carrying analog/digital conversion on a baseband signal output by the radio frequency processing unit 102 in order to convert the baseband signal into a digital signal.

The signal detector 104 is a circuit for receiving a modulated signal having the form of a digital signal from the analog to digital converter 103 to detecting the feature quantity of the modulated signal. The signal detector 104 also has a function for outputting the modulated signal received from the analog to digital converter 103 to the signal-reception processing unit 105 and the signal recording unit 109 as it is.

The signal-reception processing unit 105 is a circuit for receiving the modulated signal from the signal detector 104 located at the stage preceding the signal-reception processing unit 105 to carry out processing on the modulated signal, including the processing including synchronization, equalization, demodulation, and decoding. As shown in FIG. 1, the signal-reception processing unit 105 is connected in series to the signal detector 104. The signal-reception processing unit 105 can also be connected in parallel to the signal detector 104. In this specification, a data signal output by the signal-reception processing unit 105 to the data judgment unit 106 is referred tows demodulated data. The term 'demodulated data' is used to imply that the modulated data includes data obtained as a result of a decoding process.

The data judgment unit 106 is a circuit for receiving the demodulated data from the signal-reception processing unit 105 and carries out determination including judgment on whether the demodulated data is correct or incorrect and determination of the data characteristic such as a communication period.

The receive buffer 107 is a recording medium or an area. The receive buffer 107 is used for receiving demodulated data completing all processing and storing the data. Typically, the receive buffer 107 is realized with a memory or an FPGA register.

The signal judgment unit 108 is a signal processing unit for inputting feedback signals from the signal detector 104, the signal-reception processing unit 105, and the data judgment unit 106 to supplying control signals to the signal detector 104, the signal-reception processing unit 105, and the data judgment unit 106. The feedback signals are signals for delivering detection or judgment results of processing blocks to the signal judgment unit 108. Meanwhile, the control signals are signals for setting judgment threshold values in the processing blocks to be used in detections and determinations to requesting the blocks to carry out processing or carry out no processing.

The signal judgment unit 108 also functions as an apparatus for outputting control signals that controls operations by the signal recording unit 109 to the signal recording unit 109, the control signals including four different types: a recording start control signal, a recording stop control signal, a signal saving control signal, and a signal discarding control signal. The signal judgment unit 108 further functions as an apparatus for receiving a judgment processing instruction from the condition setting section 110 to carry out processing specified in the judgment processing instruction. In accordance with the substance of the judgment processing instruction, the signal judgment unit 108 carries out processing including outputting the control signals, evaluating the feedback signals, and controlling the signal recording unit 109. (The processing to control the signal recording unit 109 is to start recording, stop recording, save a signal, and discard a signal).

The signal recording unit 109 is an apparatus for receiving a modulated signal obtained as an immediate result of AD conversion from the signal detector 104 to recording the signal in a recording medium or an area. The signal recording unit 109 carries out processing according to the control signals received from the signal judgment unit 108, the control signals being a recording start control signal, a recording stop control signal, a signal saving control signal, or a signal discarding control signal.

The condition setting section 110 is an input unit for generating the judgment processing instructions according to determination conditions (recording conditions) input through the user's operation to supplying the instructions to the signal judgment unit 108.

The signal output section 111 is an interface apparatus for reading out a modulated signal from the signal recording unit 109 and saving the signal in a storage apparatus or outputting the signal to a display apparatus.

[Processing Operations and Effects]

The radio communication unit according to the present embodiment is capable of selecting only an arbitrary received radio signal satisfying determination conditions (recording conditions) to record, save, and output the selected signal to a recording medium or an area.

If conditions for detecting a feature quantity of a received radio signal to be recorded and the substance of processing are described as a judgment processing instruction for example, the signal judgment unit 108 operates in collaboration with the signal detector 104, the signal-reception processing unit 105, and the data judgment unit 106 in accordance with the judgment processing instruction to determine whether the received radio signal serving as a recording object has arrived yet. If collected feedback signals satisfy determination conditions (recording conditions), the signal judgment unit 108 determines that the received radio signal serving as a recording object has arrived and then issues to the signal recording unit 109 a command to record the received radio signal.

Through a series of the processing, the radio communication unit according to the embodiment is capable of selectively recording only a received radio signal satisfying determination conditions (recording conditions) among arbitrary radio signals which can be received at the installation position.

As described above, the radio communication unit adopts a method for collecting feedback signals output by units such as the signal detector 104, the signal-reception processing unit 105, and the data judgment unit 106 to determine whether a received radio signal is a recording object on the basis of a combination of the collected feedback signals. Adoption of this method enables the radio communication unit to freely select a received radio signal serving as a recording object.

When the radio communication unit determines whether a received radio signal is a recording object with the use of a feedback signal output by the signal detector 104 for example, the radio communication unit is capable of determining whether the received radio signal satisfies recording conditions on the basis of the characteristics of a modulated signal immediately after its reception not subjected yet to any signal processing. Patent document 1 does not disclose a technology for selecting a modulated signal including all such information immediately after the signal received.

When the radio communication unit determines whether a received radio signal is a recording object with the use of a feedback signal output by the data judgment unit 106 for example, the radio communication unit is capable of determining whether the received radio signal satisfies recording conditions on the basis of the characteristics of data obtained as a result of the demodulation and, decoding processing. Thus, for example, the radio communication unit is capable of carrying out a detailed processing operation such as an operation to save the recorded signal and an operation to discard the recorded signal on the basis of a result of determination as to whether a data bit string obtained after the decoding processing is normal or includes an error. An operation to record such a signal cannot be achieved through adoption of the technology described in patent document 1.

Selection to save normal or abnormal data depends on a purpose of use of the radio communication unit by the user. The purpose is recording/saving normal data if it is to verify that the communication is carried out normally for example. On the other hand, the purpose is recording/saving abnormal data if it is to analyze a cause as to why the communication is abnormal.

As described above, according to the apparatus structure in the first embodiment, it is possible to provide a highly convenient radio communication unit to plural users having different purposes of recording/saving a received radio signal. That is to say, in the case of the radio communication unit according to the embodiment, it is possible to determine whether a received radio signal is a signal to be recorded/saved through use of a feedback signal obtained at a signal processing stage appropriate for the purpose Second Embodiment Apparatus Structure FIG. 2 is a diagram showing a typical functional structure which is more detailed than the structure of the radio communication unit explained earlier with reference to FIG. 1. The radio communication unit 100 shown in FIG. 2 is configured to include an antenna 101, a radio frequency processing unit 102, an analog to digital converter 103, a signal power detector 201, a frequency detector 202, a correlation detector 203, a synchronization processing unit 204, an equalization unit 205, demodulation unit 206, a decryption unit 207, an error judgment unit 208, a characteristic judgment unit 209, receive buffer 107, a signal judgment unit 210, a signal recording unit 211, condition setting section 110, and a signal output section 111.

Figure 3:
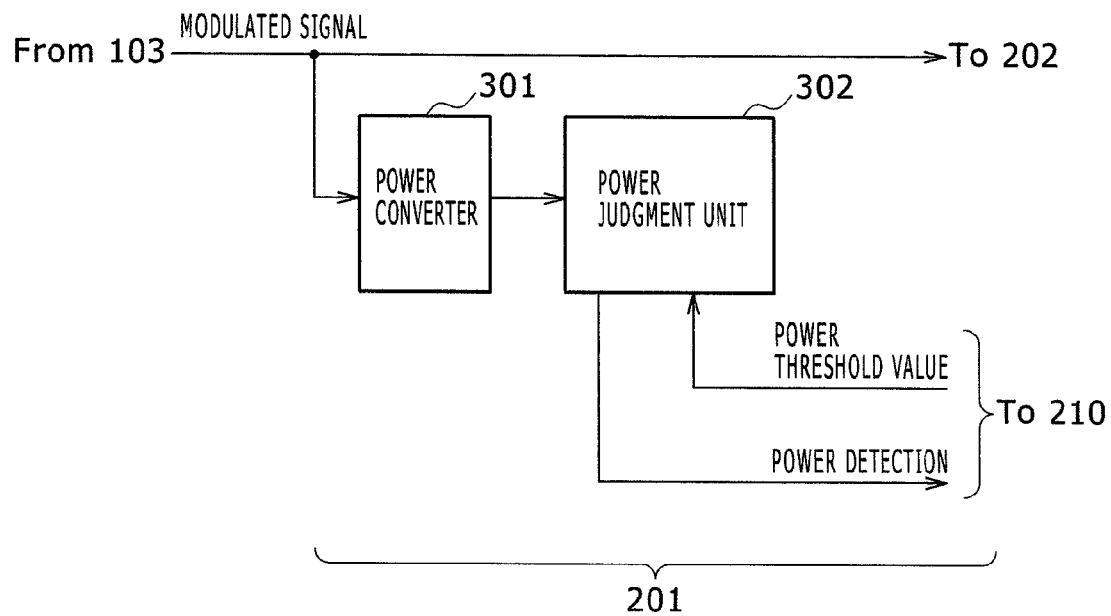
FIG. 3 is a diagram showing a typical functional structure of a signal power detector.

The signal power detector 201 is a circuit for receiving a modulated signal having a digital signal form from the analog to digital converter 103 to detect a change in the power of the modulated signal as a feature quantity. FIG. 3 shows a detailed structure of the signal power detector 201.

Figure 4:
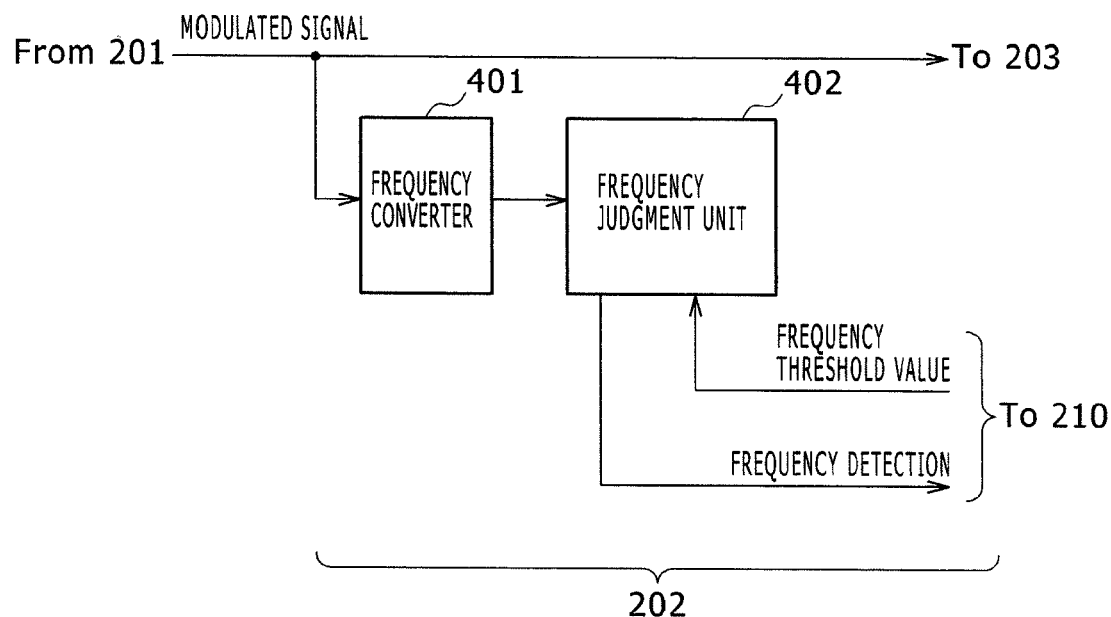
FIG. 4 is a diagram showing a typical functional structure of a frequency detector.

The frequency detector 202 is a circuit for receiving a modulated signal having a digital signal form from the signal power detector 201 to detect frequency components of the modulated signal. FIG. 4 shows a detailed structure of the frequency detector 202.

Figure 5:
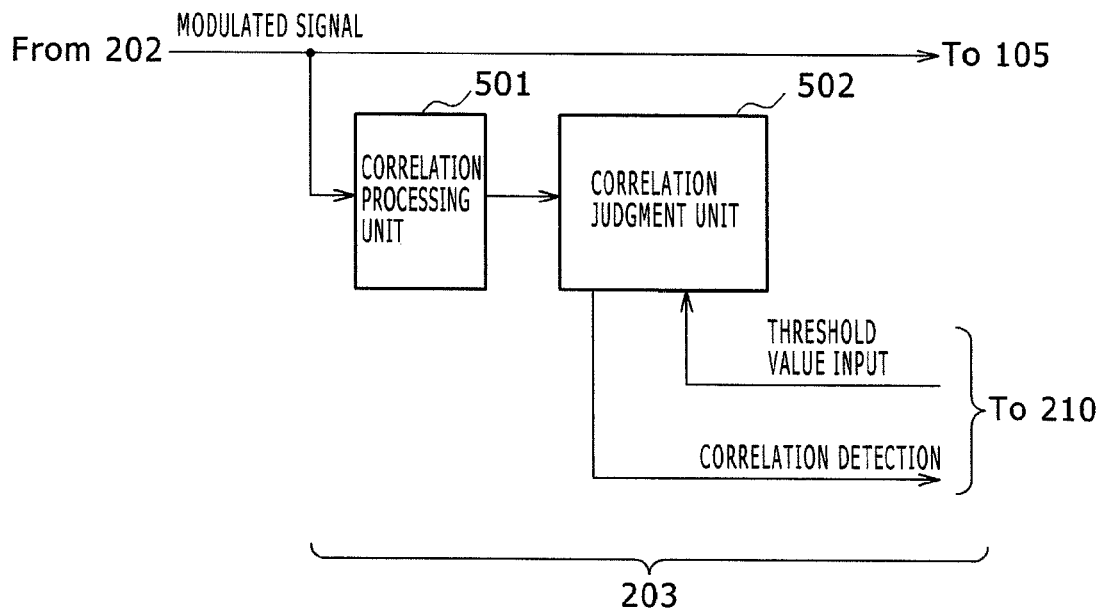
FIG. 5 is a diagram showing a typical functional structure of a correlation detector.

The correlation detector 203 is a circuit for receiving a modulated signal having a digital signal form from the frequency detector 202 to detect a correlation value of the modulated signal. FIG. 5 shows a detailed structure of the correlation detector 203. The signal power detector 201, the frequency detector 202, and the correlation detector 203 which are described above correspond to the signal detector 104 in the first embodiment.

Figure 6:
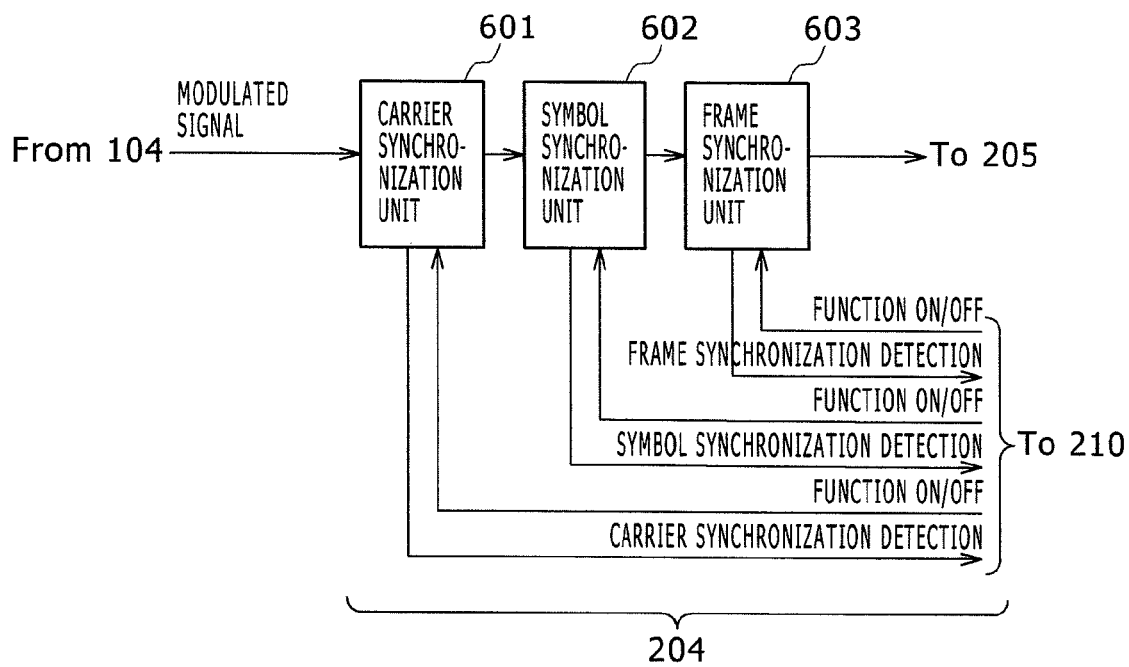
FIG. 6 is a diagram showing a typical functional structure of a synchronization processing unit.

The synchronization processing unit 204 is a circuit for receiving a modulated signal having a digital signal form from the correlation detector 203 to carry out processing such as carrier synchronization, symbol synchronization, and frame synchronization. FIG. 6 shows a detailed structure of the synchronization processing unit 204.

Figure 7:
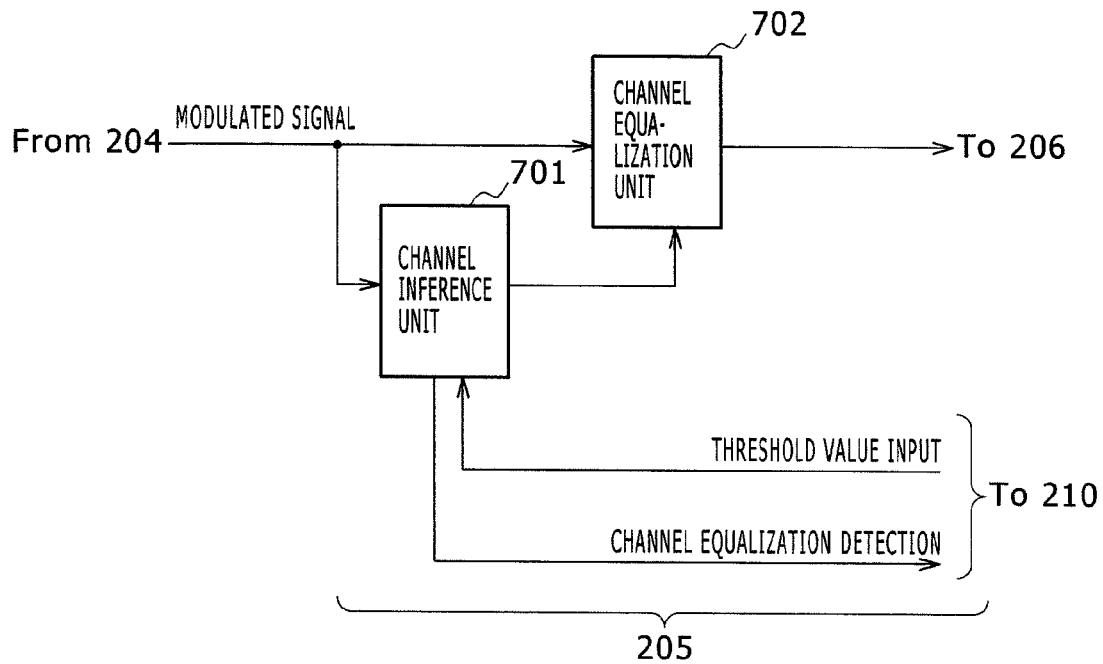
FIG. 7 is a diagram showing a typical functional structure of an equalization unit.

The equalization unit 205 is a circuit for receiving a modulated signal having a digital signal form from the synchronization processing unit 204 to carry out channel inference and channel equalization processing. FIG. 7 shows a detailed structure of the equalization unit 205.

Figure 8:
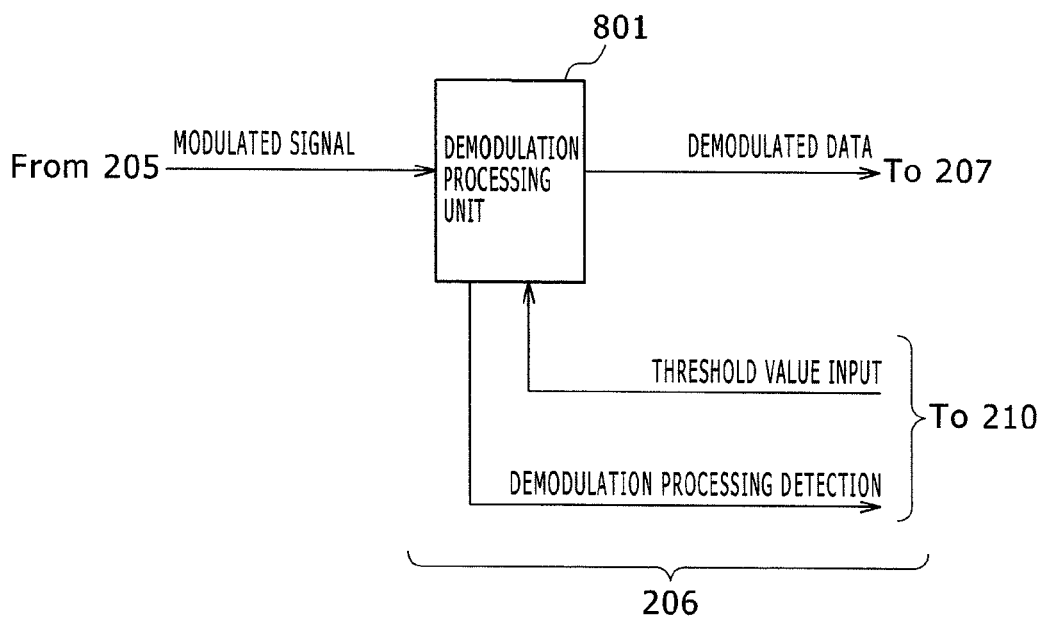
FIG. 8 is a diagram showing a typical functional structure of a demodulation unit.

The demodulation unit 206 is a circuit for receiving a modulated signal having a digital signal form from the equalization unit 205 to carry out demodulation processing corresponding to the method used to modulate the received radio signal. FIG. 8 shows a detailed structure of the demodulation unit 206.

Figure 9:
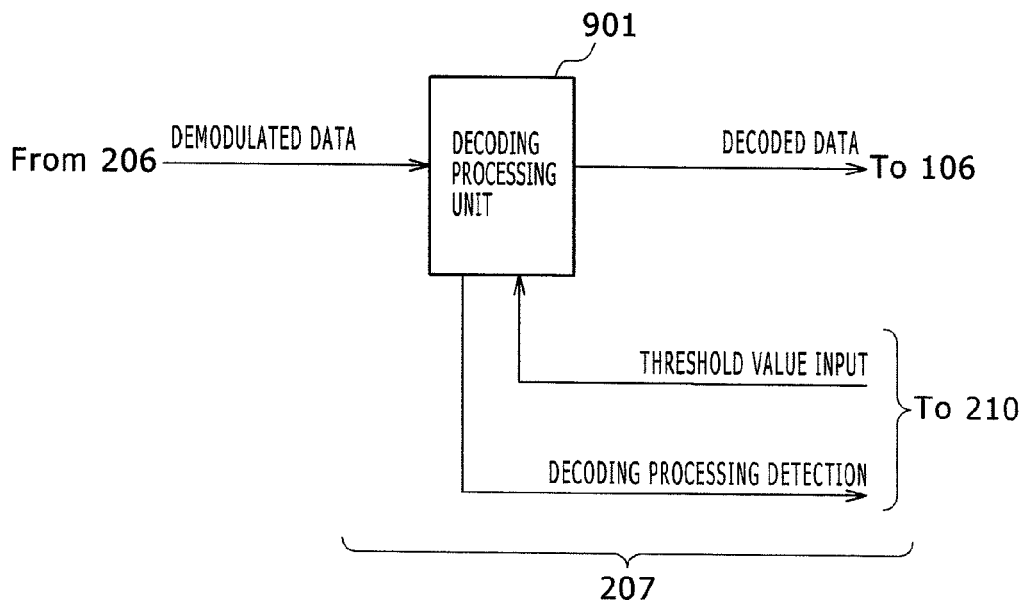
FIG. 9 is a diagram showing a typical functional structure of a decryption unit.

The decryption unit 207 is a circuit for receiving a modulated signal having a digital signal form from the demodulation unit 206 to carry out decoding processing corresponding to the method used to code the received radio signal. FIG. 9 shows a detailed structure of the decryption unit 207. The synchronization processing unit 204, the equalization unit 205, the demodulation unit 206 and the decryption unit 207 which are described above correspond to the signal-reception processing unit 105 employed in the first embodiment.

Figure 10:
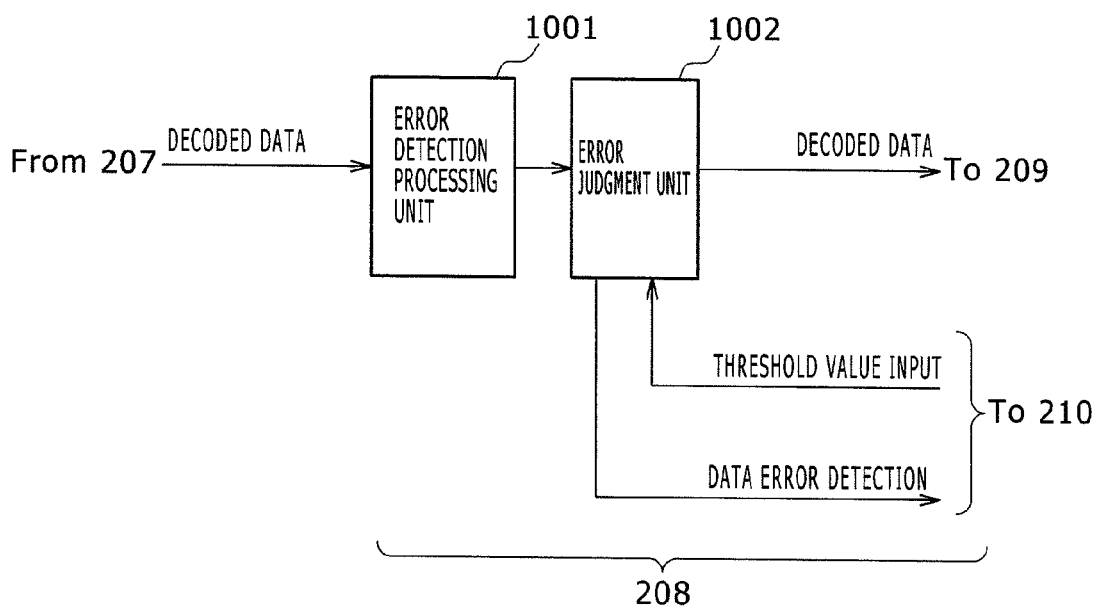
FIG. 10 is a diagram showing a typical functional structure of a data error judgment unit.

The error judgment unit 208 is a circuit for receiving demodulated data having a digital signal form from the decryption unit 207 to carry out error judgment on the demodulated data. FIG. 10 shows a detailed structure of the error judgment unit 208.

Figure 11:
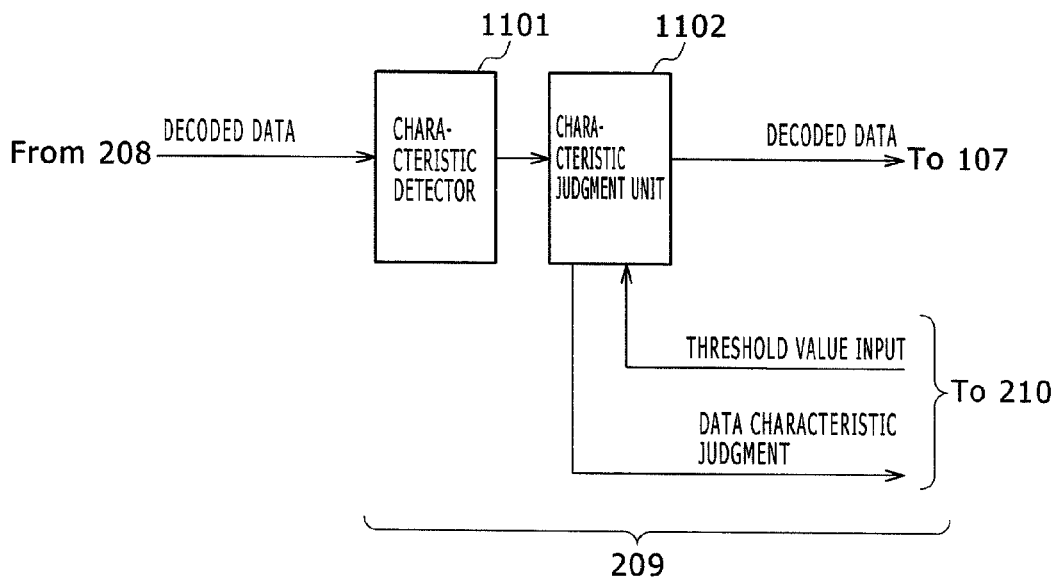
FIG. 11 is a diagram showing a typical functional structure of a data characteristic judgment unit.

The characteristic judgment unit 209 is a circuit for receiving demodulated data having a digital signal form from the error judgment unit, 208 to carry out characteristic determination such as communication-period determination on the demodulated data. FIG. 11 shows a detailed structure of the characteristic judgment unit 209. The error judgment unit 208 and the characteristic judgment unit 209 which are described above correspond to the data judgment unit 106 employed in the first embodiment.

Figure 12:
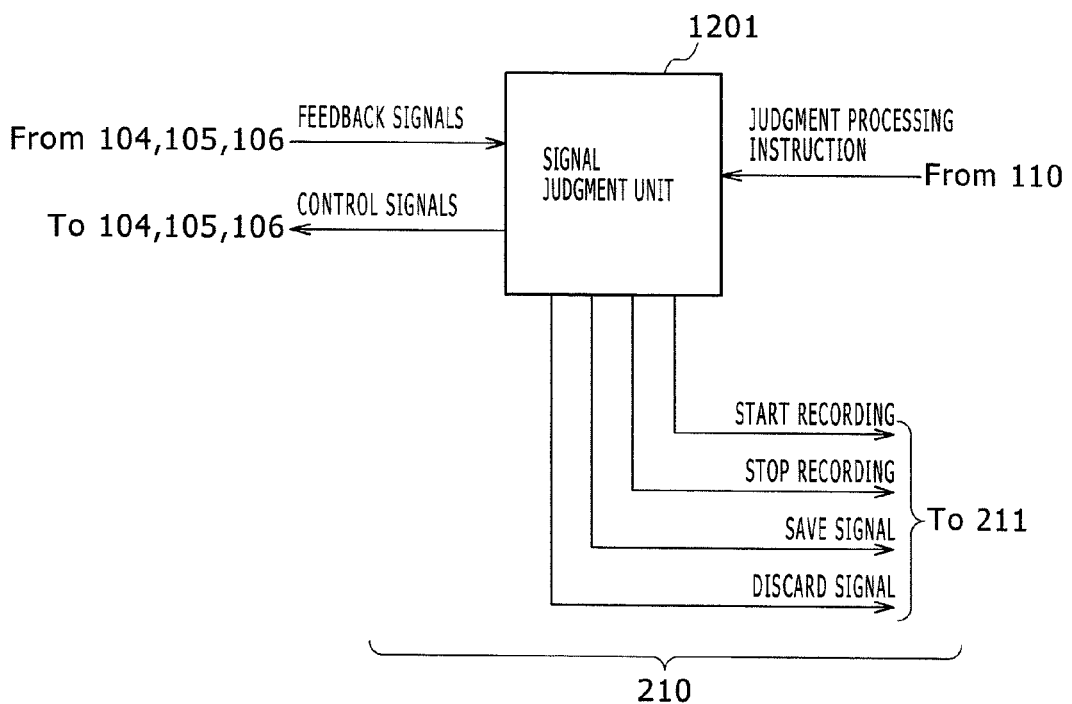
FIG. 12 is a diagram showing a typical functional structure of a signal judgment unit.

The signal judgment unit 210 is a circuit for inputting feedback signals from the signal power detector 201, the frequency detector 202, the correlation detector 203, the synchronization processing unit 204, the equalization unit 205, the demodulation unit 206, the decryption unit 207, the error judgment unit 208, and the characteristic judgment unit 209 to output control signals to the signal power detector 201, the frequency detector 202, the correlation detector 203, the synchronization processing unit 204, the equalization unit 205, the demodulation unit 206, the decryption unit 207, the error judgment unit 208, and the characteristic judgment unit 209. FIG. 12 shows a detailed structure of the signal judgment unit 210. The signal judgment unit 210 also has a function to output control signals to the signal recording unit 211 as signals for controlling operations carried out in the signal recording unit 211, the control signals being a recording start control signal, a recording stop control signal, a signal saving control signal, or a signal discarding control signal. The signal judgment unit 210 also has a function serving as an apparatus for receiving a judgment processing instruction from the condition setting section 110 and carrying out processing specified in the judgment processing instruction. In accordance with a description in the judgment processing instruction, the signal judgment unit 210 carries out processing to output the control signals, evaluate the feedback signals, and control the signal recording unit 211, the control processing including the recording start control signal, the recording stop control signal, the signal saving control signal, and the signal discarding control signal.

Figure 13:
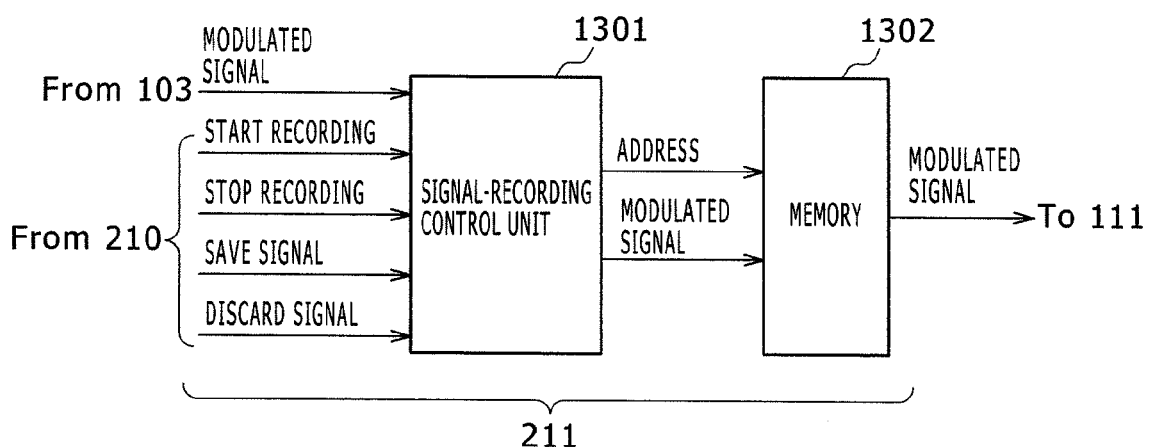
FIG. 13 is a diagram showing a typical functional structure of a signal recording unit.

The signal recording unit 211 is an apparatus for receiving a modulated signal output directly from the analog to digital converter 103 to record the signal into a recording medium or an area. The signal recording unit 211 carries out processing in accordance with the control signals received from the signal judgment unit 210, the control signals being a recording start control signal, a recording stop control signal, a signal saving control signal, or a signal discarding control signal. FIG. 13 shows a detailed structure of the signal recording unit 211.

[Detailed Structures of Blocks]

Detailed structures of the functional blocks are explained next.

FIG. 3 shows a typical functional structure of the signal power detector 201. As shown in FIG. 3, the signal power detector 201 has a structure including a series circuit having a power converter 301 and a power judgment unit 302 connected to each other. The series circuit is connected in parallel to the transmission line of the modulated signal. The power converter 301 is a circuit for integrating the modulated signal in order to compute a power value. The power judgment unit 302 is a circuit for comparing the computed power value with a threshold value set by the signal judgment unit 210 in order to determine whether the power value is greater or smaller than the threshold value. If the judgment result (comparison result) satisfies output conditions, the power judgment unit 302 outputs a power detection signal to the signal judgment unit 210 to notify the signal judgment unit 210 that the power of a modulated signal satisfying the output condition has been detected. The power detection signal in this case corresponds to a feedback signal. The conditions for outputting the power detection signal may require that the computed power value be either greater or smaller than the threshold value. The conditions for outputting the power detection signal are set by the signal judgment unit 210.

FIG. 4 shows a typical detailed structure of the frequency detector 202. As shown in FIG. 4, the frequency detector 202 has a structure including a series circuit comprising a frequency converter 401 and a frequency judgment unit 402 which are connected to each other. The series circuit is connected in parallel to the transmission line of the modulated signal. The frequency converter 401 is a circuit for applying typically Fourier transform processing to the modulated signal in order to compute a frequency component. The frequency judgment unit 402 is a circuit for determining whether the computed frequency component matches a threshold value set by the signal judgment unit 210. If the judgment result satisfies output conditions, the frequency judgment unit 402 outputs a frequency detection signal to the signal judgment unit 210 to notify the signal judgment unit 210 that the frequency component of a modulated signal satisfying the output condition has been detected. The frequency detection signal in this case corresponds to a feedback signal. The conditions for outputting the frequency detection signal may require that the computed frequency component either match or mismatch the threshold value. The conditions for outputting the frequency detection signal are set by the signal judgment unit 210.

FIG. 5 shows a typical detailed structure of the correlation detector 203. As shown in FIG. 5, the correlation detector 203 has a structure including a series circuit having a correlation processing unit 501 and a correlation judgment unit 502 connected to each other. The series circuit is connected in parallel to the transmission line of the modulated signal. The correlation processing unit 501 is a circuit for carrying out correlation processing with the modulated signal taken as an object. The correlation processing is autocorrelation processing making use of the modulated signal itself or mutual correlation processing employing a correlation pattern set by the signal judgment unit 210. The correlation judgment unit 502 is a circuit for comparing a correlation value obtained as a result of the correlation processing with a threshold value set by the signal judgment unit 210 in order to determine whether the correlation value is greater or smaller than the threshold value. If the judgment result (comparison result) satisfies output conditions, the correlation judgment unit 502 outputs a correlation detection signal to the signal judgment unit 210 to notify the signal judgment unit 210 that the correlation of a modulated signal satisfying the output condition has been detected. The correlation detection signal in this case corresponds to a feedback signal. The conditions for outputting the correlation detection signal may require that the computed correlation value be either greater or smaller than the threshold value. The conditions for outputting the correlation detection signal are set by the signal judgment unit 210.

FIG. 6 shows a typical detailed structure of the synchronization processing unit 204. As shown in FIG. 6, the synchronization processing unit 204 has a structure including a series circuit having a carrier synchronization unit 601, a symbol synchronization unit 602, and a frame synchronization unit 603 connected to each other with respect to the transmission line of the modulated signal.

The carrier synchronization unit 601 is a processing circuit for correcting a frequency shift caused by a shift between clocks of the transmitter and the receiver this case, a functional ON/OFF signal is for setting whether to use a result of synchronization processing. If the functional ON/OFF signal is ON (that is, if the result is to be used), a carrier-synchronization detection signal is output to the signal judgment unit 210 in order to notify the signal judgment unit 210 of the result of the synchronization processing. The carrier-synchronization detection signal corresponds to a feedback signal.

The symbol synchronization unit 602 is a processing circuit for determining a symbol timing of the modulated signal. In this case, a functional ON/OFF signal is for setting whether to use a result of synchronization processing. If the functional ON/OFF signal is ON (that is, if the result is to be used), a symbol-synchronization detection signal is output to the signal judgment unit 210 to notify the signal judgment unit 210 of the result of the synchronization processing. The symbol-synchronization detection signal corresponds to a feedback signal.

The frame synchronization unit 603 is a processing circuit for detecting the start of the modulated signal. In this case, a functional ON/OFF signal is for setting whether to use a result of synchronization processing. If the functional ON/OFF signal is ON (that is, if the result is to be used), a frame-synchronization detection signal is output to the signal judgment unit 210 to notify the signal judgment unit 210 of the result of the synchronization processing. The frame-synchronization detection signal corresponds to a feedback signal.

FIG. 7 shows a typical detailed structure of the equalization unit 205. As shown in FIG. 7, the equalization unit 205 is configured to include a channel inference unit 701 and a channel equalization unit 702. The channel inference unit 701 is connected in parallel to the transmission line of the modulated signal whereas the channel equalization unit 702 is connected in series to the transmission line of the modulated signal. The channel inference unit 701 is a circuit for comparing a pilot signal held in the radio apparatus in advance with the modulated signal to compute changes of the amplitude and phase of the modulated signal. A threshold-value input signal is for supplying a threshold value of the amplitude or the phase in channel inference processing. A channel-equalization detection signal is for supplying the result of the channel inference processing to a signal judgment unit. The channel-equalization detection signal corresponds to a feedback signal. The channel equalization unit 702 is a circuit for correcting the modulated signal to a signal close to the pilot signal on the basis of changes inferred through the channel inference unit 701 as changes of the amplitude and phase of the modulated signal.

FIG. 8 shows a typical detailed structure of the demodulation unit 206. As shown in FIG. 8, the demodulation unit 206 is configured to include a demodulation unit 801 connected in series to the transmission line of the modulated signal. The demodulation unit 801 is a circuit for carrying out demodulation processing for a modulation method applied to the modulated signal to convert the modulation signal into demodulated data. A threshold-value input signal is for supplying a threshold value for a feature quantity in demodulation processing. A demodulation-processing detection signal is for supplying a result of the demodulation processing to a signal judgment unit. The demodulation-processing detection signal corresponds to a feedback signal.

FIG. 9 shows a typical detailed structure of the decryption unit 207. As shown in FIG. 9, the decryption unit 207 is configured to include a decryption unit 901 connected in series to the transmission line of demodulated data. The decryption unit 901 is a circuit for carrying out decoding processing for a coding method applied to the modulated signal to convert the demodulated data into decoded data. A threshold-value input signal is for supplying a threshold value for a feature quantity in decoding processing. A decoding-processing detection signal is for supplying a result of the decoding processing to a signal judgment unit. The decoding-processing detection signal corresponds to a feedback signal.

FIG. 10 shows a typical detailed structure of the error judgment unit 208. As shown in FIG. 10, the error judgment unit 208 is configured to include an error detection processing unit 1001 and an error judgment unit 1002 which are connected in series to the transmission line of decoded data. The error detection processing unit 1001 is a circuit for receiving the decoded data to carry out typically CRC processing on the data. The error judgment unit 1002 is a circuit for receiving a result of error detection to carry out error judgment. A threshold-value input signal is for setting an operation mode in which, for example, a datan error detection signal is to be output if no error has been detected or a datan error detection signal is to be output if an error has been reversely detected. The datan error detection signal corresponds to a feedback signal.

FIG. 11 shows a typical detailed structure of the characteristic judgment unit 209. As shown in FIG. 11, the characteristic judgment unit 209 is configured to include a characteristic detector 1101 and a characteristic judgment unit 1102 which are connected in series to the transmission line of decoded data. The error detection processing unit 1001 is a circuit for detecting characteristics of the decoded data. An example of the characteristic value is statistical information such as the communication period of the decoded data and an error rate of the data. The characteristic judgment unit 1102 is a circuit for determining whether the value of the detected characteristic conforms to a threshold value. For example, the characteristic judgment unit 1102 determines whether a received signal is a signal conforming to the input communication period. A threshold-value input signal is for supplying a threshold value for the characteristic value described above. A data-characteristic determination signal is for supplying a result of the determination processing to the signal judgment unit 210. The data-characteristic determination signal corresponds to the feedback signal.

FIG. 12 shows a typical detailed structure of the signal judgment unit 210. As shown in FIG. 12, the signal judgment unit 210 is configured to include a signal judgment unit 1201. As described before, a feedback signal is a signal received from a detector or a judgment unit. A control signal is a signal that requests the detector and the judgment unit to input a threshold value or carry out processing determined in advance. A judgment processing instruction signal is a signal received from the condition setting section 110. The judgment processing instruction signal describes a set value and a processing operation procedure (operation flow). The set value is a value set as a value regarding a signal feature quantity for recording a desired radio signal. A recording start signal is for supplying an instruction to start recording a received radio signal (modulated signal) to the signal recording unit 211. A recording stop signal is for supplying an instruction to stop recording a received radio signal (modulated signal) to the signal recording unit 211. A signal saving signal is for providing the signal recording unit 211 with an instruction to save a received radio signal (modulated signal) that the signal recording unit 211 records. A signal discarding signal is for providing the signal recording unit 211 with an instruction to discard a received radio signal (modulated signal) that the signal recording unit 211 records. In accordance with the substance of processing described in the judgment processing instruction, the signal judgment unit 1201 carries out the processing on the basis of proper conditions of feature quantity and a proper order to exchange control signals and feedback signals with the detector/processing-unit and the signal recording unit 211. A desired radio signal can be recorded through the exchanges of these signals.

FIG. 13 shows a typical detailed structure of the signal recording unit 211. As shown in FIG. 13, the signal recording unit 211 is configured to include, a signal-recording control unit 1301 and a memory 1302. The signal-recording control unit 1301 is a unit for generating a signal for controlling operations to record a modulated signal. A modulated signal in a signal-reception wait state is normally supplied from the analog to digital converter 103. As a recording start signal is received, the signal-recording control unit 1301 specifies an address in the memory 1302 and starts recording of a modulated signal. When a recording stop signal has been received, the signal-recording control unit 1301 stops recording of a modulated signal into the memory 1302. When a signal saving signal has been received, the signal-recording control unit 1301 outputs a modulated signal recorded in the memory 1302 to the signal output section 111. When a signal discarding signal has been received, the signal-recording control unit 1301 discards a modulated signal that has been recorded in the memory 1302. To put it concretely, a new modulated signal is granted permission to write in addresses at which a modulated signal has already been recorded.

[Typical Setting conditions Described in a Judgment Processing Instruction]

FIG. 14 shows typical setting conditions (recording conditions) described in a judgment processing instruction. As described before, setting conditions include determination conditions and a processing substance which are supplied to detectors/judgment-units in order to selectively record only a desired received radio signal (modulated signal). FIG. 14 shows typical setting conditions. As shown in the figure, for example, the power detection is effective (ON) and the power threshold value is set at −70 dBm. The frequency detection is effective (ON), the center frequency of frequencies to be detected is set at 2,450 MHz, and the bandwidth is set at 5 MHz. The correlation detection, the synchronization processing, the equalization processing, the demodulation processing, and the decoding processing are ineffective (OFF). The error judgment is effective (ON) and a datan error is set as a detection object. On the top of these, the characteristic determination is effective (ON) and the communication period is set at 500 ms.

In the radio communication unit according to the embodiment, in collaboration with the detectors and the judgment units, the signal judgment unit 210 carries out operations to determine and detect the arrival of a received radio signal matching the defined setting conditions and selectively record only the received radio signal matching the defined setting conditions. It is to be noted that, in the conditions shown in FIG. 14, the ineffective state of the synchronization processing, the equalization processing, the demodulation processing, and the decoding processing implies that the determination processing carried out in the signal judgment unit 210 is not utilized. Thus, as conventional signal-reception processing, the synchronization processing, the equalization processing, the demodulation processing and the decoding processing are carried out in the same way as the conventional radio communication unit.

[Typical Processing Operations Based on Descriptions in a Judgment Processing Instruction]

Figure 15:
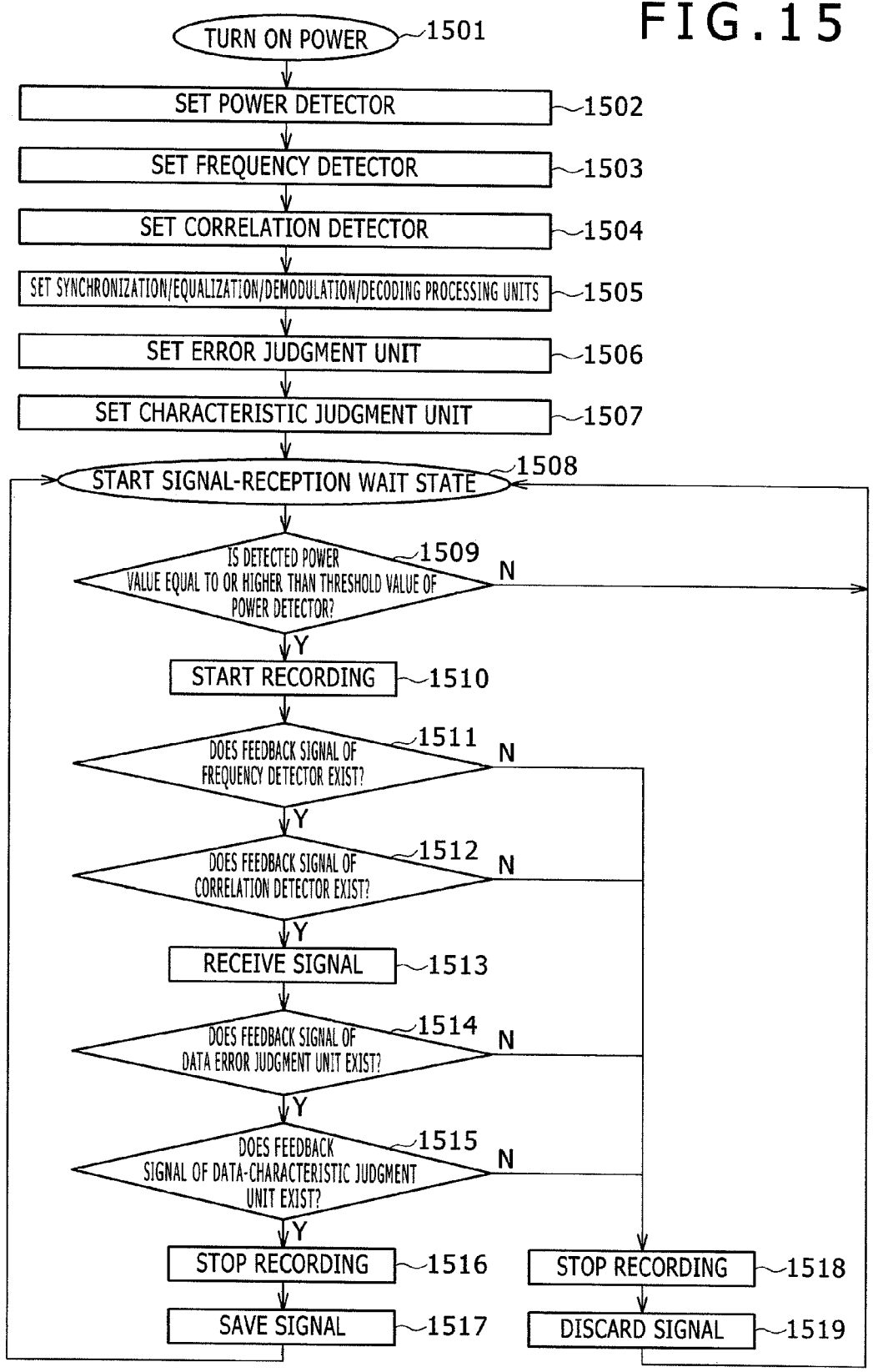
FIG. 15 is a flowchart to be referred to in explanation of typical processing operations carried out in the signal judgment unit.

FIG. 15 shows a typical processing operation procedure based on a description in a judgment processing instruction. After the power of the radio communication unit is turned on at the step 1501, in accordance with signal conditions described in the judgment processing instruction, the signal judgment unit 210 carries out initial setting operations of processing blocks. To put it concretely, at the step 1502, a power threshold value is set in the signal power detector 201 and, at the step 1503, a frequency threshold value is set in the frequency detector 202. At the step 1504, a threshold value is set in the correlation detector 203. At the step 1505, determination function is set in the synchronization processing unit 204, a threshold value is set in the equalization unit 205, a threshold value is set in the demodulation unit 206 and a threshold value is set in the decryption unit 207. At the step 1506, a threshold value is set in the error judgment unit 208 whereas, at the step 1507, a threshold value is set in the characteristic judgment unit 209.

The radio communication unit starts to be in a signal-reception wait state at the step 1508 once the initial setting carried out by the signal judgment unit 210 is completed. As a received radio signal arrives, at the step 1509, the power judgment unit 302 computes the power value of the received radio signal and compares the power value with the threshold value input in advance. If the power value is not greater than the threshold value, the signal judgment unit 210 continues the signal-reception wait state at the step 1508.

If the power value is greater than the threshold value, on the contrary, the signal judgment unit 210 determines that the received radio signal serving as a recording candidate has arrived. The signal judgment unit 210 then starts signal recording at the step 1510. Specifically, the signal judgment unit 210 determines that the desired received radio signal has arrived when the signal judgment unit 210 receives a power detection signal as a feedback signal from the signal power detector 201. The signal judgment unit 210, at the same time, outputs a recording start signal to the signal recording unit 211. Receiving the recording start signal, the signal recording unit 211 starts recording of the received radio signal.

After the start of the recording, the signal judgment unit 210 acquires a result of an analysis of a frequency component of a modulated signal from the frequency detector 202. At the step 1511, the signal judgment unit 210 determines if the frequency component of the modulated signal satisfies setting conditions on the basis of whether a feedback signal is present. If the result of the determination indicates that the frequency component of the modulated signal does not satisfy the setting conditions, the signal judgment unit 210 stops the recording of the received radio signal at the step 1518. At the step 1519, the signal judgment unit 210 further discards a signal that has been recorded.

Specifically, receiving a frequency detection signal as a feedback signal from the frequency detector 202, the signal judgment unit 210 determines that the arriving received radio signal does not match the desired signal. At this time, the signal judgment unit 210 outputs a recording stop signal to the signal recording unit 211. Receiving the recording stop signal, the signal recording unit 211 stops the recording of the received radio signal. The signal judgment unit 210 then outputs a signal discarding signal to the signal recording unit 211. The signal recording unit 211 discards the signal that has been recorded through allowing a new signal to be written into the address area used so far for recording the discarded modulated signal.

If the frequency component of the modulated signal satisfies the frequency condition (that is, if a feedback signal was not received), meanwhile, the signal judgment unit 210 determines if a correlation result satisfies the setting conditions on the basis of whether a feedback signal is present at the step 1512. If the signal judgment unit 210 determines that the arriving received radio signal does not match the desired signal, the signal judgment unit 210 stops the recording at the step 1518 and discards the signal that has been recorded at the step 1519.

If the signal judgment unit 210 determines that the arriving received radio signal matches the desired signal, the signal judgment unit 210 carries out signal-reception processing at the step 1513. The signal judgment unit 210 permits executions on processing in a variety of processing units in particular, the processing including synchronization, equalization, demodulation, and decoding for the purpose of controlling the signal recording.

At an ensuing step 1514, the signal judgment unit 210 finds a result of error judgment on the basis of whether a feedback signal output by the error judgment unit 208 is present. Depending on whether the data is normal or abnormal, the signal judgment unit 210 determines either to stop the recording at the step 1518 and discard the signal at the step 1519 or to continue the signal recording.

At the step 1515, the signal judgment unit 210 subsequently finds a result of determination for a characteristic value of demodulated data on the basis of whether a feedback signal output by the characteristic judgment unit 209 is present. If the characteristic value does not match a threshold value, the signal judgment unit 210 stops the recording at the step 1518 and discards the signal at the step 1519. If the characteristic value matches the threshold value, on the contrary, the signal judgment unit 210 stops the recording at the step 1516 and saves the recorded signal at the step 1517. What is described above is a sequence of processing operations to record one received radio signal. The signal judgment unit 210 thereafter goes back to the signal-reception wait state of the step 1508.

The processing operations explained above are described in a processing determination instruction. These processing operations are described typically in the form of a script or a program where the order of execution of the processing operations is written.

[Effects]

Through these processing operations, the radio communication unit according to the embodiment is capable of arbitrarily selecting only a received radio signal satisfying the determination conditions (recording conditions) and recording, saving, and outputting the selected signal to a recording medium or an area.

If conditions for detecting a feature quantity of a received radio signal to be recorded and the substance of processing are described as a judgment processing instruction for example, the signal judgment unit 210 operates in collaboration with the signal power detector 201, the frequency detector 202, the correlation detector 203, the synchronization processing unit 204, the equalization unit 205, the demodulation unit 206, the decryption unit 207, the error judgment unit 208, and the characteristic judgment unit 209 in accordance with the judgment processing instruction and determines presence or absence of the received radio signal serving as an object of recording. If a set of feedback signals satisfies determination conditions (recording conditions), the signal judgment unit 210 determines that the received radio signal to be recorded has arrived and requests the signal recording unit 211 to record and save the received radio signal.

Through this series of operations, the radio communication unit according to the embodiment is capable of selecting only a received radio signal satisfying determination conditions (recording conditions) among arbitrary radio signals which can be received at the installation position and capable of recording and saving the selected signal.

As described above, the radio communication unit according to the embodiment makes use of feedback signals output by the signal power detector 201 to determine whether a received radio signal is an object of signal reception. That is to say, the radio communication unit according to the embodiment uses a modulated signal right after the analog to digital converter 103 to determine whether a received radio signal is an object of signal reception. As a result, the radio communication unit according to the embodiment is capable of recording and saving the modulated signal right after the analog to digital converter 103, the modulated signal not being subjected to any signal processing.

In addition, the radio communication unit according to the embodiment uses a feedback signal the frequency detector 202 outputs to determine signal recording processing. Through this determination processing, the radio communication unit according to the embodiment is capable of detecting a modulated signal having a desired frequency component and selectively recording and saving a desired modulated signal.

The radio communication unit according to the embodiment uses a feedback signal the correlation detector 203 outputs to determine signal recording processing. Through this determination processing, the radio communication unit according to the embodiment is capable of detecting a signal having a correlation in any arbitrary signal pattern and selectively recording and saving a desired modulated signal.

The radio communication unit according to the embodiment uses a feedback signal that the error judgment unit 208 outputs in order to determine signal recording processing. Through this determination processing, the radio communication unit according to the embodiment is capable of selectively recording and saving a desired modulated signal in accordance with a result indicating that an error is included or not included in a post-decoding data sequence.

The radio communication unit according to the embodiment uses a feedback signal the characteristic judgment unit 209 outputs to determine signal recording processing. Through this determination processing, the radio communication unit according to the embodiment is capable of detecting only a modulated signal arriving periodically at intervals of typically 500 milliseconds and selectively recording and saving a desired modulated signal.

There are a variety of radio signals to be recorded and saved that have different characteristics in accordance with the user's objective. As described before, however, the radio communication unit according to the embodiment is capable of properly selecting a desired radio signal through combining feedback signals and capable of recording and saving the selected signal.

[Typical Appearance of the Radio Communication Unit]

Figure 16:
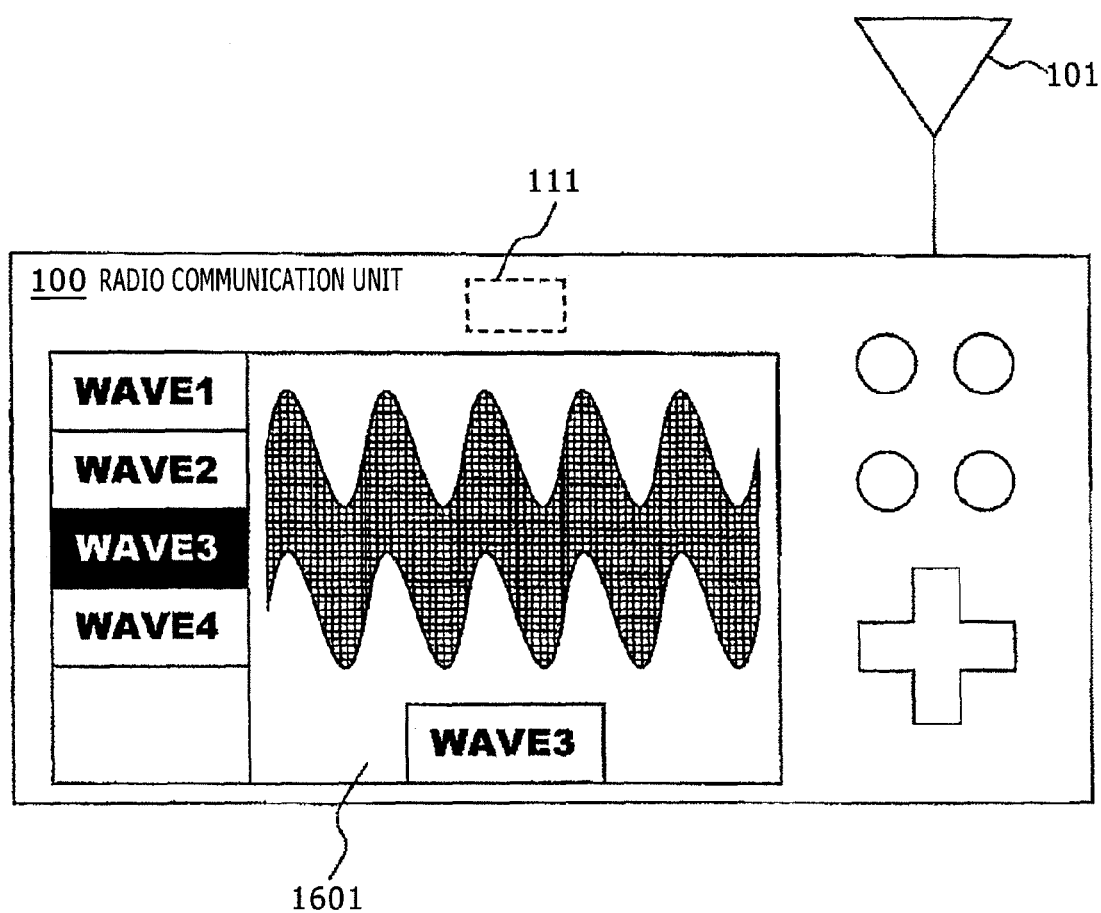
FIG. 16 is a diagram showing a typical external structure of a radio communication unit.

FIG. 16 shows an example in which a radio communication unit 100 and a display apparatus 1601 are provided in the same box, the display apparatus 1601 being an apparatus for visually displaying a received radio signal that has been recorded. In FIG. 16, a waveform denoted by symbol wave3 is selectively displayed. The different operation buttons serving as operation input means are laid out on the box surfaces surrounding the display apparatus 1601.

Figures 17, 18:
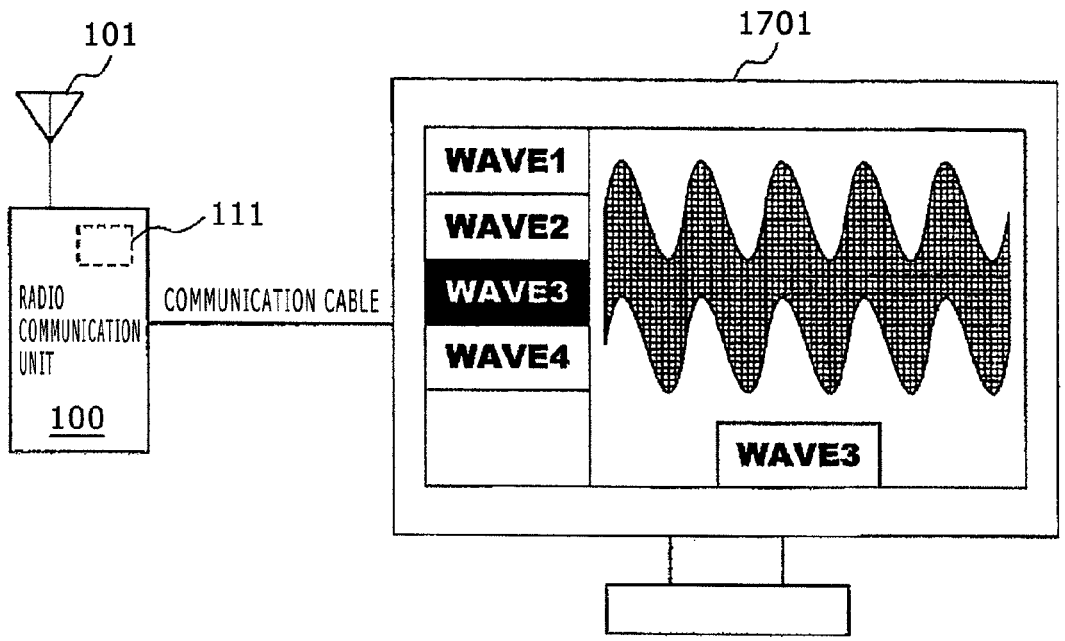
FIG. 17 is a diagram showing a typical external structure of a radio communication unit.
FIG. 18 is a diagram showing typical classification of radio signals.

FIG. 17 shows an example in which a radio communication unit and a display apparatus are each configured as an independent apparatus. In the typical structure shown in FIG. 17, the signal output section 111 employed in the radio communication unit and an external output apparatus 1701 are connected to each other through a communication cable. It is needless to say that the connection via the communication cable can be replaced by radio communication. In the typical structure shown in FIG. 17, the signal output section 111 outputs a received communication signal recorded in the radio communication unit 100 to the external output apparatus 1701 through the communication cable. As shown in FIG. 17, the external output apparatus 1701 is provided with the display apparatus for visually displaying the received communication signal recorded in the radio communication unit 100.

[Variety of Radio Signals to be Received]

As described above, the radio communication unit proposed in this specification is capable of selecting, recording, and saving any arbitrary radio signal. In addition, the radio communication unit proposed in this specification is characterized in that the user is allowed to input conditions for selecting the arbitrary radio signal to the apparatus through the condition setting section 110.

FIG. 18 shows a representative example of classification of radio signals that can be handled by the radio communication unit proposed in this specification. The vertical axis of FIG. 18 represents equipment serving as sources each generating a radio signal to be recorded and saved. The horizontal axis represents characteristics of the radio signals. As shown in FIG. 18, the radio signals are constantly radiated in the real world, the signals having a variety of feature quantities such as a broadband, a narrow band, continuity, and discontinuity. If an attempt is made to record all such miscellaneous radio signals, the amount of information rises substantially so that it is difficult to search the information having an extremely large amount for truly useful information.

In order to solve the above problem, in the radio communication unit proposed in this specification, condition setting section 110 is provided for inputting a specified setting conditions so that any arbitrary radio signal can be selected from all receivable radio signals.

There are more than one combination of information required for selecting any arbitrary radio signal from miscellaneous ones. Thus, by merely comparing a signal obtained from equalization processing with a threshold value as is the case with the technology described in patent document 1, it is impossible to deal with any arbitrary received radio signal. In order to solve this problem, in the radio communication unit proposed in this specification, individual conditions are given to determination and processing units contributing to signal-reception processing series serving as conditions required for identifying a received radio signal to be recorded. A feedback signal showing the judgment results of the identification is collected to the signal judgment unit 210. The arriving received radio signal is thereafter selectively recorded and saved if the collected feedback signal satisfies all setting conditions (recording conditions).

Third Embodiment

In a third embodiment, the structure of the radio communication unit 100 implemented by the second embodiment is assumed as a premise. The description of the third embodiment explains a system configuration of a radio communication unit and its processing operations for a case in which concrete setting conditions are given.

FIG. 19 shows setting conditions (recording conditions) of a received radio signal to be selectively recorded and saved in the embodiment. In the setting conditions (recording conditions) shown in FIG. 19, the power detection is controlled to effective (ON) and the power threshold value is set at −80 dBm. The frequency detection is controlled to effective (ON), the center frequency of those to be detected is set at 2,450 MHz, and the bandwidth is set at 5 MHz. The correlation detection is controlled to effective (ON) and the correlation mode is set to autocorrelation. Meanwhile, the synchronization processing is set to ineffective (OFF). The equalization processing, the demodulation processing, and the decoding processing are each set to ineffective (OFF). The error judgment is controlled to ineffective (OFF) and normal data is set as an object of detection. On the top of that, the characteristic determination is effective (ON) and the communication period is set at 500 ms. That is to say, this embodiment is intended to be an embodiment in which, among radio signals transmitted at a communication period of 500 ms, only a received radio signal demodulated normally is recorded.

Figure 20:
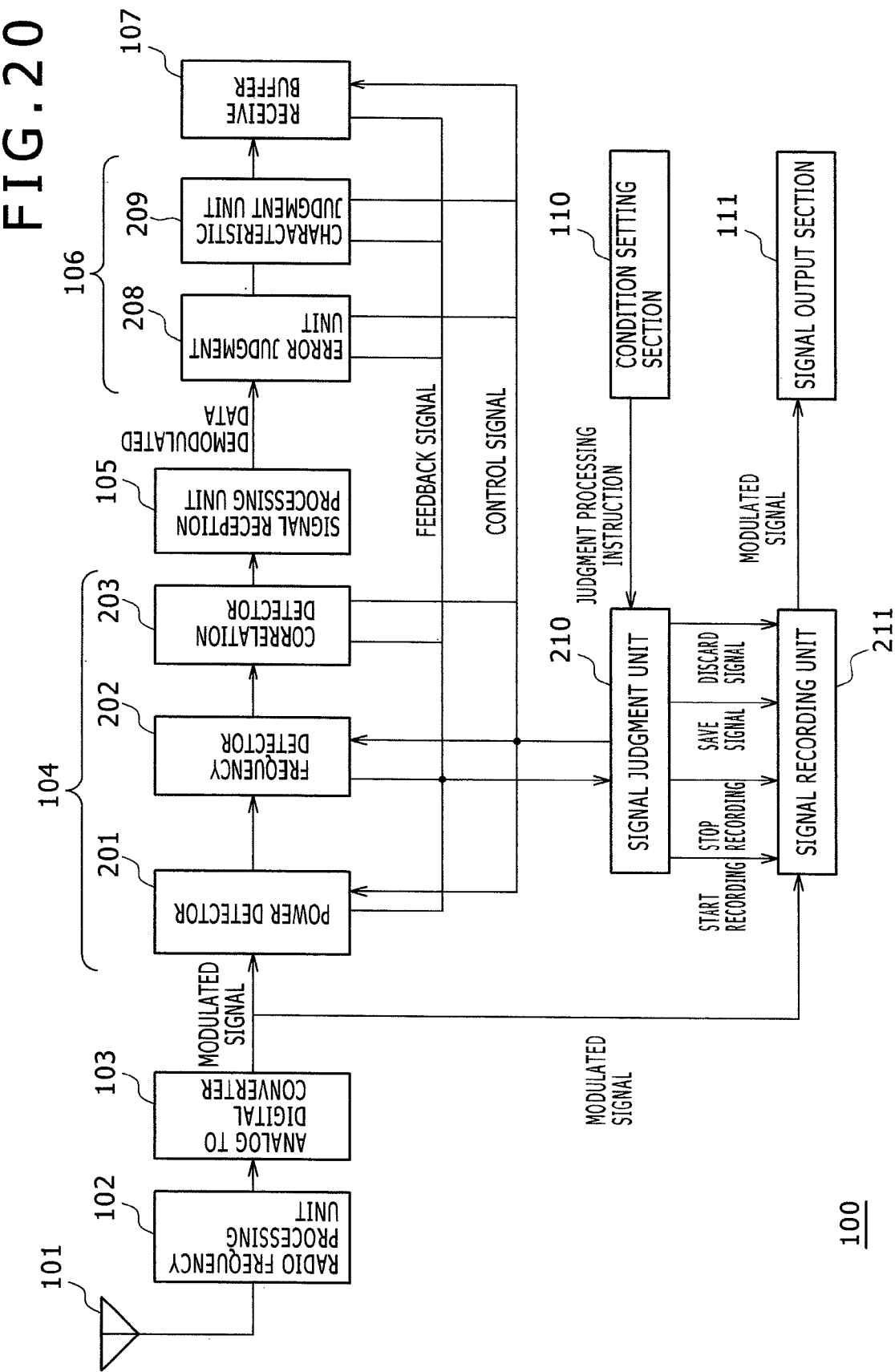
FIG. 20 is a diagram showing a typical functional structure of a radio communication unit.

FIG. 20 is an equivalent diagram showing input/output relations of feedback signals in the radio communication unit according to the third embodiment in such a way that the relations can be understood with ease. The radio communication unit 100 is configured to include an antenna 101, a radio frequency processing unit 102, an analog to digital converter 103, a signal power detector 201, a frequency detector 202, a correlation detector 203, a signal-reception processing unit 105, an error judgment unit 208, a characteristic judgment unit 209, a receive buffer 107, a signal judgment unit 210, a signal recording unit 211, condition setting section 110, and a signal output section 111. As shown in FIG. 20, the embodiment uses only feedback signals output from the signal detector 104 and, the data judgment unit 106. It is needless to say that the effective/ineffective states and the threshold values for the respective units composing the signal detector 104 and the data judgment unit 106 are switched on the basis of the setting conditions shown in FIG. 19. The third embodiment, assuming the hardware structure adopted by the second embodiment as a premise, can however adopt an apparatus structure that has only the input/output relations shown in FIG. 20 as relations of the feedback signals in the hardware.

Figure 21:
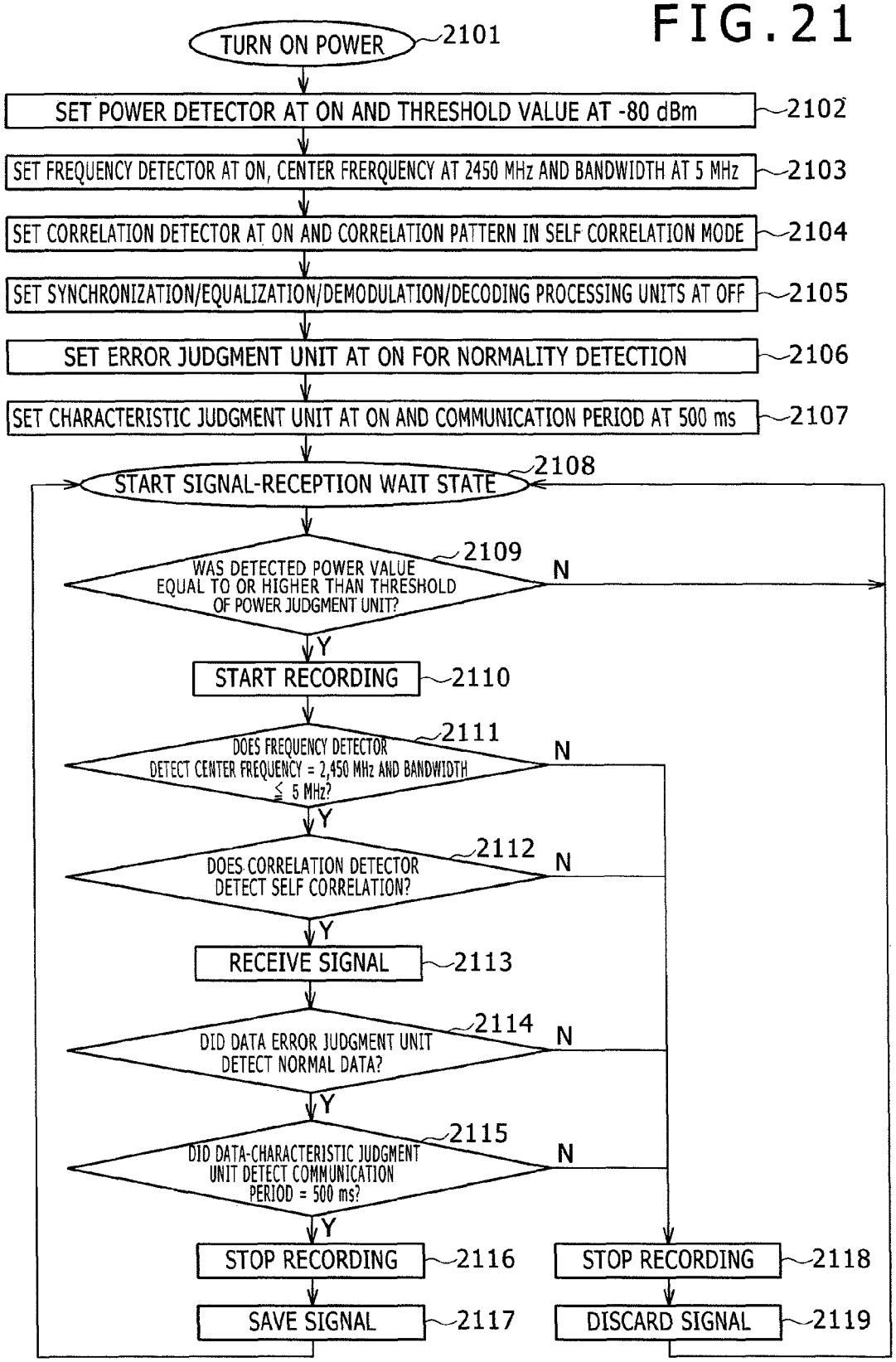
FIG. 21 is a flowchart to be referred to in explanation of typical processing operations carried out in the signal judgment unit.

FIG. 21 shows a typical processing operation procedure based on a description in a judgment processing instruction for the third embodiment. After the power of the radio communication unit is turned on at the step 2101, the signal judgment unit 210 controls the signal power detector 201 to the effective (ON) state and sets the threshold value at −80 dBm at the step 2102. The signal judgment unit 210 then controls the frequency detector 202 to the effective (ON) state, sets the center frequency of those to be detected at 2,450 MHz, and sets the bandwidth at 5 MHz at the step 2103.

At the step 2104, the signal judgment unit 210 controls the correlation detector 203 to the effective (ON) state and sets the detection mode at an autocorrelation mode. At the step 2105, the signal judgment unit 210 controls the synchronization processing unit 204, the equalization unit 205, the demodulation unit 206, and the decryption unit 207 to the ineffective (OFF) state. At the step 2106, the signal judgment unit 210 sets normal data as an object of detection. Then, at the step 2107, the signal judgment unit 210 controls the characteristic judgment unit 209 to the effective (ON) state and sets the communication period at 500 ms.

The radio communication unit starts a signal-reception wait state at the step 2108 once the above initial setting is completed. As a received radio signal arrives, at the step 2109, the signal power detector 201 computes the power value of the received radio signal and compares the power value with −80 dBm to determine whether the computed power value is greater or smaller than −80 dBm. If the computed power value is smaller than −80 dBm (that is, if the signal judgment unit 210 does not receive a feedback signal from the signal power detector 201), the signal judgment unit 210 continues the signal-reception wait state (goes back to the step 2108). If the computed power value is greater than −80 dBm (that is, if the signal judgment unit 210 has received a feedback signal from the signal power detector 201), at the same time, the signal judgment unit 210 determines that the received radio signal serving as a recording candidate has arrived. The signal judgment unit 210 accordingly starts signal recording at the step 2110.

The signal judgment unit 210 subsequently acquires a result of an analysis of a frequency component from the frequency detector 202. To put it concretely, at the step 2111, the signal judgment unit 210 determines whether a feedback signal has been received from the frequency detector 202. The feedback signal is output by the frequency detector 202 if the center frequency of the received radio signal is 2,450 MHz and the bandwidth is not greater than 5 MHz.

If the judgment result indicates inconformity, the signal judgment unit 210 stops the recording of the received radio signal at the step 2118. At the step 2119, the signal judgment unit 210 further discards a signal that has been recorded. If the result of the determination indicates conformity, the signal judgment unit 210 determines whether a feedback signal has been received from the correlation detector 203 at the step 2112. The feedback signal is output by the correlation detector 203 if the radio signal has autocorrelation.

If the arriving received radio signal is determined to be a signal not having the autocorrelation, the signal judgment unit 210 stops the recording at the step 2118 and discards the signal at the step 2119. If the arriving received radio signal is determined to be a signal having the autocorrelation, the signal judgment unit 210 waits for signal-reception processing to be carried out by the signal-reception processing unit 105 at the step 2113. Specifically, the signal judgment unit 210 waits for execution of processing such as synchronization, equalization, demodulation, and decoding.

At the step 2114, the signal judgment unit 210 thereafter determines whether a feedback signal output from the error judgment unit 208 has been received. The feedback signal is output from the error judgment unit 208 if the demodulated data is normal. If the demodulated data is abnormal, the signal judgment unit 210 stops the signal recording at the step 2118 and discards the recorded signal that has been recorded at the step 2119. If the demodulated data is normal, the signal judgment unit 210 continues the signal recording.

Then, at the step 2115, the signal judgment unit 210 determines whether a feedback signal output from the characteristic judgment unit 209 has been received. The feedback signal is output from the characteristic judgment unit 209 if the communication period of the data is 500 ms. If the communication period of the data is not 500 ms, the signal judgment unit 210 stops the signal recording at the step 2118 and discards the signal that has been recorded at the step 2119. If the communication period of the data is 500 ms, on the other hand, the signal judgment unit 210 stops the signal recording at the step 2116 and saves the signal that has been recorded at the step 2117. What is described above is a sequence of processing operations carried out to record one received radio signal and after that, the signal judgment unit 210 goes back to the signal-reception wait state of the step 2108.

The processing operations explained above are carried out on the basis of a processing determination instruction. Through the processing operations explained above, only a radio signal satisfying the conditions shown in FIG. 19 is selectively recorded and a radio signal not satisfying the conditions is discarded.

Fourth Embodiment

By the same token, in a fourth embodiment, the structure of the radio communication unit 100 explained in the second embodiment is assumed as a premise. The description of the fourth embodiment describes a system configuration of a radio communication unit and its processing operations for a case in which concrete setting conditions are given.

FIG. 22 shows setting conditions (recording conditions) of a received radio signal to be selectively recorded and saved in the embodiment. In the setting conditions (recording conditions) shown in FIG. 22, the power detection is controlled to effective (ON) and the power threshold value is set at −70 dBm. The frequency detection is controlled to effective (ON), the center frequency of those to be detected is set at 2,450 MHz, and the bandwidth is set at 5 MHz. The correlation detection is controlled to effective (ON) and the correlation mode is set to autocorrelation. The synchronization processing, the equalization processing, the demodulation processing, and the decoding processing are each set to ineffective (OFF). The error judgment is controlled to ineffective (OFF) and incorrect data is set as an object of detection. On the top of that, the characteristic determination is set in an ineffective (OFF). That is to say, this embodiment is intended to be an embodiment in which only a received radio signal that could not be demodulated normally is recorded.

Figure 23:
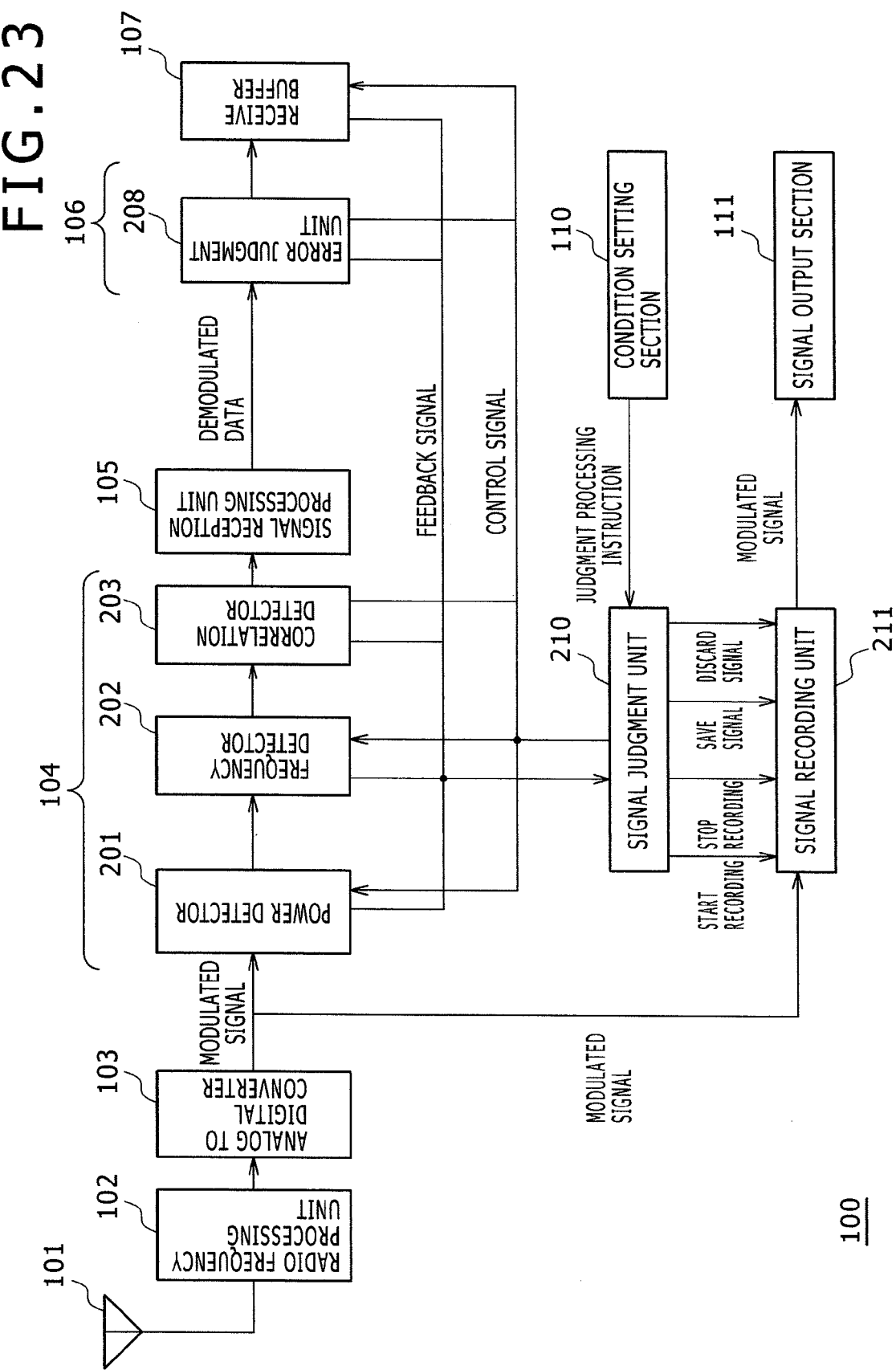
FIG. 23 is a diagram showing a typical functional structure of a radio communication unit.

FIG. 23 is an equivalent diagram showing input/output relations of feedback signals in the radio communication unit according to the fourth embodiment in such a way that the relations can be understood with ease. The radio communication unit 100 is configured to include an antenna 101, a radio frequency processing unit 102, an analog to digital converter 103, a signal power detector 201, a frequency detector 202, a correlation detector 203, a signal-reception processing unit 105, an error judgment unit 208, a receive buffer 107, a signal judgment unit 210, a signal recording unit 211, condition setting section 110, and a signal output section 111. As shown in FIG. 23, the embodiment uses only feedback signals output from some units in the signal detector 104 and the data judgment unit 106. It is needless to say that the effective/ineffective states and the threshold values of the units composing the signal detector 104 and the data judgment unit 106 are switched on the basis of the setting conditions shown in FIG. 22. The fourth embodiment, assuming as a premise the hardware structure adopted by the second embodiment, can adopt an apparatus structure that has only the input/output relations shown in FIG. 23 as relations of the feedback signals in the hardware.

Figure 24:
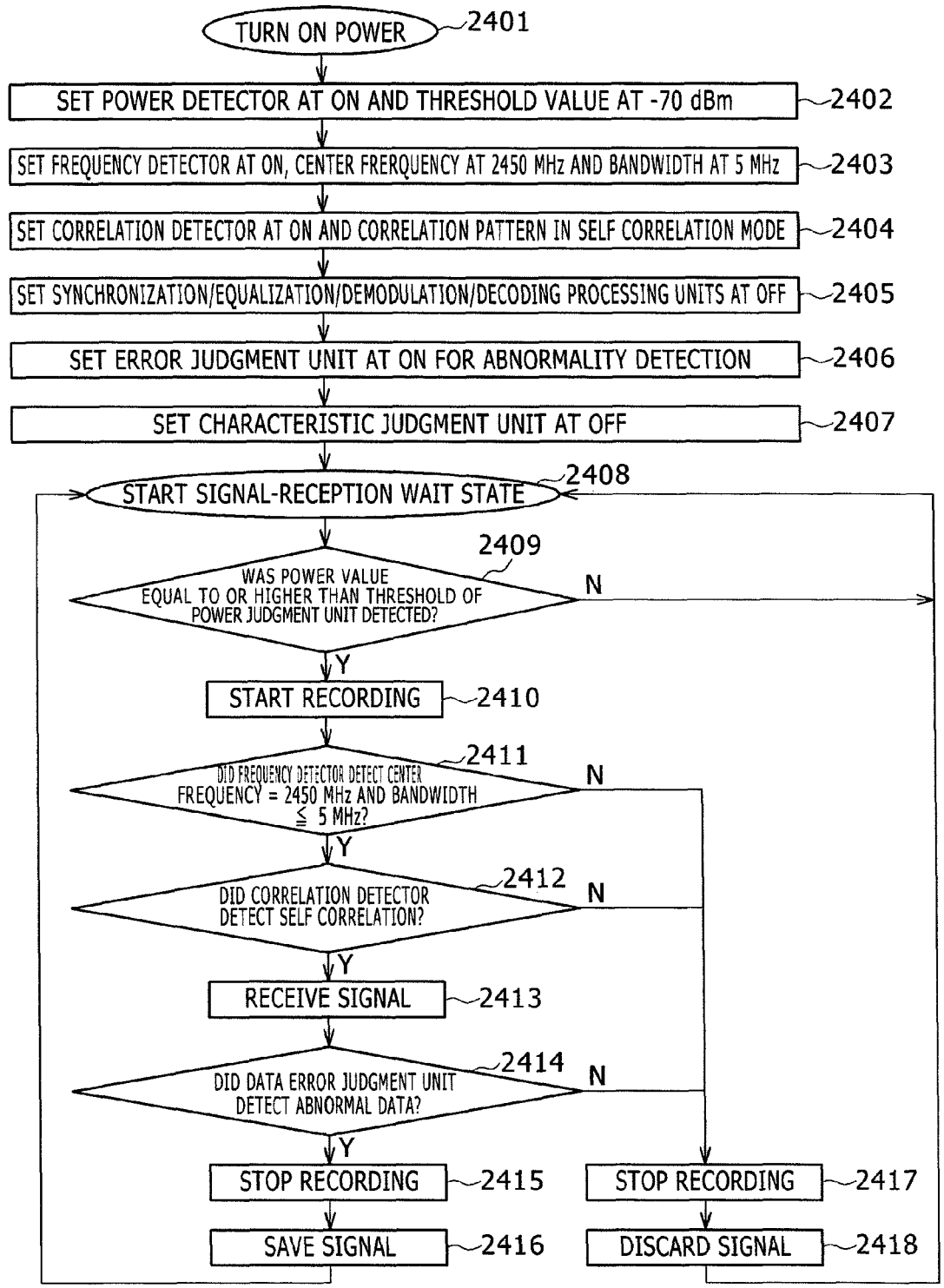
FIG. 24 is a flowchart to be referred to in explanation of typical processing operations carried out in the signal judgment unit.

FIG. 24 shows a typical processing operation procedure based on a description in a judgment processing instruction corresponding to the fourth embodiment. After the power of the radio, communication unit has been turned on at the step 2401, the signal judgment unit 210 controls the signal power detector 201 to the effective (ON) state and sets the threshold value at −70 dBm at the step 2402. The signal judgment unit 210 then controls the frequency detector 202 to the effective (ON) state, sets the center frequency of those to be detected at 2,450 MHz, and sets the bandwidth at 5 MHz at the step 2403.

At the step 2404, the signal judgment unit 210 controls the correlation detector 203 to the effective (ON) state and sets the detection mode at an autocorrelation mode. At the step 2405, the signal judgment unit 210 controls the synchronization processing unit 204, the equalization unit 205, the demodulation unit 206 and the decryption unit 207 to the ineffective (OFF) state. At the step 2406, the signal judgment unit 210 controls the error judgment unit 208 to the effective (ON) state and sets incorrect data as an object of detection. At the step 2407, the signal judgment unit 210 controls the characteristic judgment unit 209 to the ineffective (OFF) state.

The radio communication unit starts a signal-reception wait state at the step 2408 once the above initial setting is completed. As a received radio signal arrives, at the step 2409, the signal power detector 201 computes the power value of the received radio signal and compares the power value with −70 dBm to determine whether the computed power value is greater or smaller than −70 dBm. If the computed power value is smaller than −70 dBm (that is, if the signal judgment unit 210 does not receive a feedback signal from the signal power detector 201), the signal judgment unit 210 continues the signal-reception wait state (goes back to the step 2408). If the computed power value is greater than −70 dBm (that is, if the signal judgment unit 210 has received a feedback signal from the signal power detector 201), the signal judgment unit 210 determines that the received radio signal serving as a recording candidate has arrived. The signal judgment unit 210 accordingly starts signal recording at the step 2410.

The signal judgment unit 210 subsequently acquires a result of an analysis of a frequency component from the frequency detector 202. Specifically, at the step 2411, the signal judgment unit 210 determines whether a feedback signal has been received from the frequency detector 202. The feedback signal is output from the frequency detector 202 if the center frequency of the received radio signal is 2,450 MHz and the bandwidth is not greater than 5 MHz.

If the result of the determination indicates inconformity, the signal judgment unit 210 stops the recording of the received radio signal at the step 2417. At the step 2418, the signal judgment unit 210 further discards a signal that has been recorded till that point. If the result of the determination indicates conformity, the signal judgment unit 210 determines whether a feedback signal has been received from the correlation detector 203 at the step 2412. The feedback signal is output from the correlation detector 203 if the radio signal has autocorrelation.

If the arriving received radio signal is determined to be a signal not having the autocorrelation, the signal judgment unit 210 stops the recording at the step 2417 and discards the signal that has been recorded at the step 2418. If the arriving received radio signal is determined to be a signal having the autocorrelation, the signal judgment unit 210 waits for signal-reception processing to be carried out by the signal-reception processing unit 105 at the step 2413. To put it concretely, the signal judgment unit 210 waits for execution of processing such as the synchronization, equalization, demodulation, and decoding.

At the step 2414, the signal judgment unit 210 thereafter determines whether a feedback signal output from the error judgment unit 208 has been received. The feedback signal is output from the error judgment unit 208 if the demodulated data is abnormal. The signal judgment unit 210 stops the signal recording at the step 2417 and discards the signal that has been recorded at the step 2418 if the demodulated data is normal. If the demodulated data is abnormal, the signal judgment unit 210 stops the signal recording at the step 2415 and discards the signal that has been recorded at the step 2416. What is described above is a sequence of processing operations carried out to record one received radio signal. The signal judgment unit 210 accordingly goes back to the signal-reception wait state of the step 2408.

The processing operations explained above are carried out on the basis of a processing determination instruction. Through the processing operations described above, only a radio signal satisfying conditions shown in FIG. 22 is selectively recorded and a radio signal not satisfying the conditions is discarded.

Fifth Embodiment

By the same token, in a fifth embodiment, the structure of the radio communication unit 100 implemented in the second embodiment is assumed as a premise. The description of the fifth embodiment explains a system configuration of a radio communication unit and its processing operations for a case in which concrete setting conditions are given.

FIG. 25 shows setting conditions (recording conditions) of a received radio signal to be selectively recorded and saved in the embodiment. In the setting conditions (recording conditions) shown in FIG. 25, the power detection is controlled to effective (ON) and the power threshold value is set at −85 dBm. The frequency detection is controlled to effective (ON), the center frequency of those to be detected is set at 2,450 MHz, and the bandwidth is set at 100 MHz. The correlation detection, the synchronization processing, the equalization processing, the demodulation processing, the decoding processing, the error judgment, and the characteristic determination are each set to ineffective (OFF). That is to say, this embodiment is intended for monitoring a bandwidth of 100 MHz and recording all received radio signals.

Figure 26:
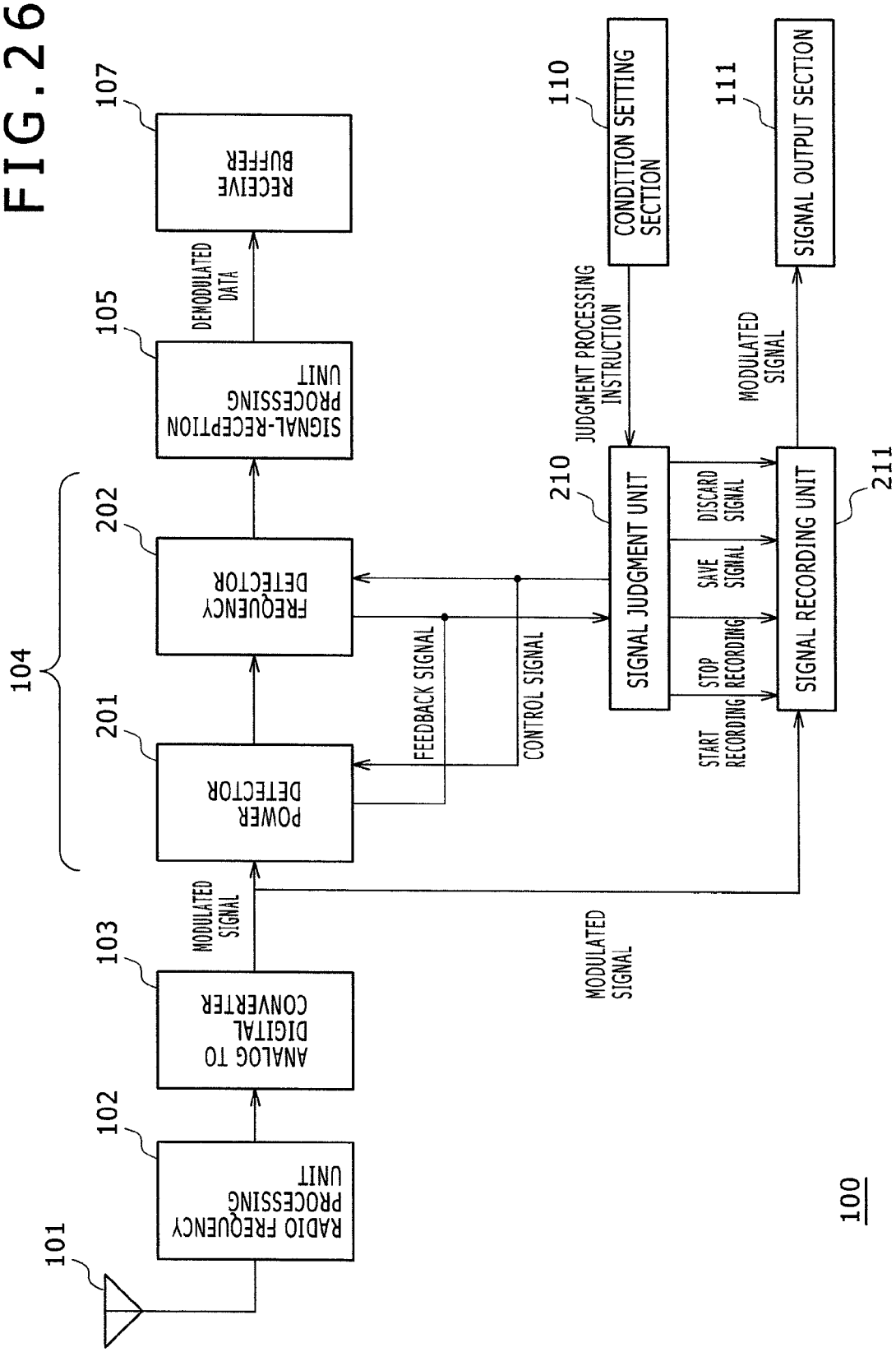
FIG. 26 is a diagram showing a typical functional structure of a radio communication unit.

FIG. 26 is a diagram showing a combination of feedback signals in the radio communication unit according to the fifth embodiment in such a way that the combination can be understood with ease. The radio communication unit 100 is configured to include an antenna 101, a radio frequency processing unit 102, an analog to digital converter 103, a signal power detector 201, a frequency detector 202, a signal-reception processing unit 105, receive buffer 107, a signal judgment unit 210, a signal recording unit 211, condition setting section 110, and a signal output section 111. As shown in FIG. 26, the embodiment uses only feedback signals output from a section in the signal detector 104. The fifth embodiment, assuming the hardware structure adopted by the second embodiment, can adopt as a premise an apparatus structure that has only the input/output relations shown in FIG. 26 as relations of the feedback signals in the hardware.

Figure 27:
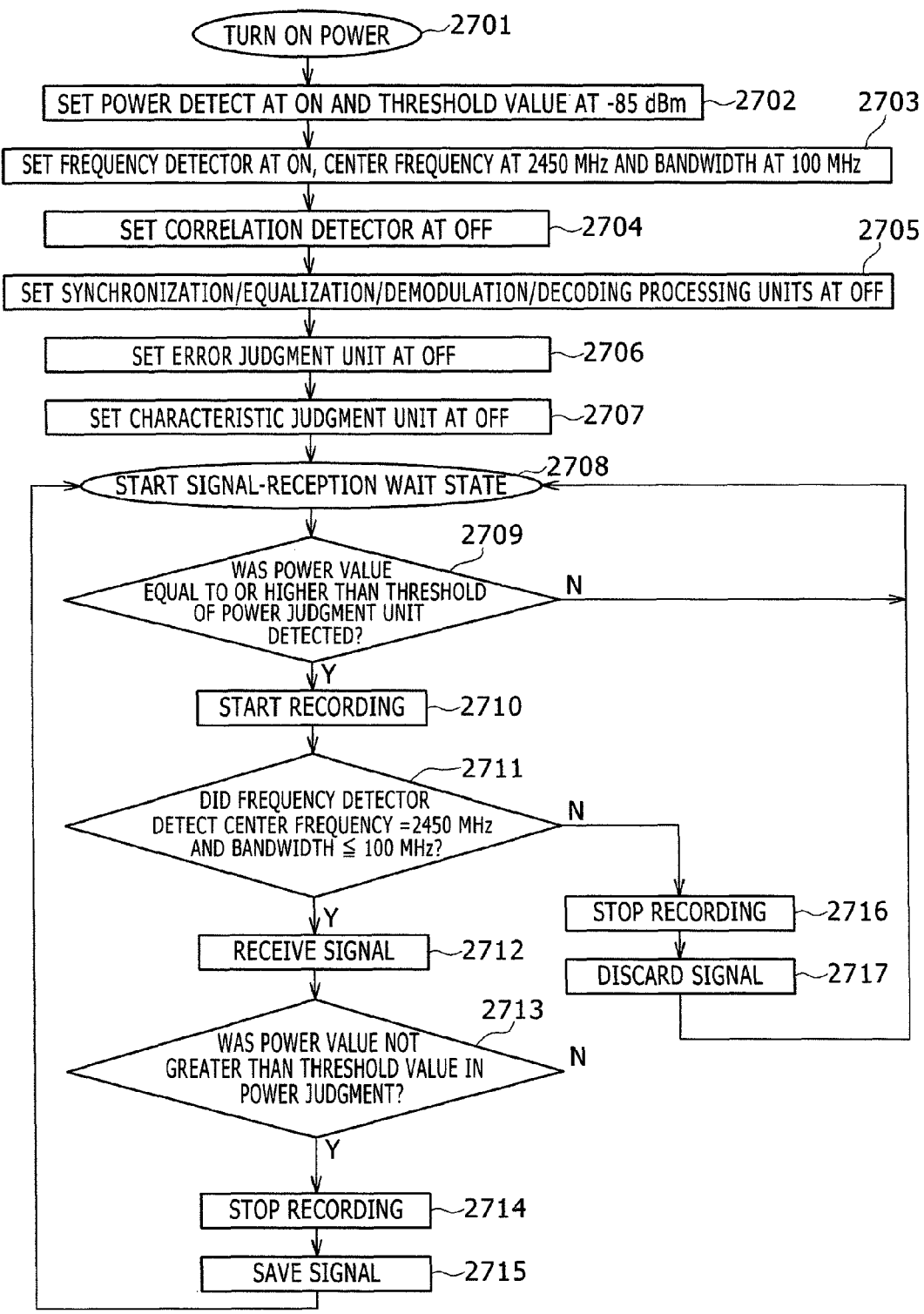
FIG. 27 is a flowchart to be referred to in explanation of typical processing operations carried out in the signal judgment unit.

FIG. 27 shows a typical processing operation procedure based on a description in a judgment processing instruction for the fifth embodiment. After the power of the radio communication unit is turned on at the step 2701, the signal judgment unit 210 controls the signal power detector 201 to the effective (ON) state and sets the threshold value at −85 dBm at the step 2702. The signal judgment unit 210 controls the frequency detector 202 to the effective (ON) state, sets the center frequency of those to be detected at 2,450 MHz, and sets the bandwidth at 100 MHz at the step 2703.

At the step 2704, the signal judgment unit 210 controls the correlation detector 203 to the ineffective (OFF) state. At the step 2705, the signal judgment unit 210 controls the synchronization processing unit 204, the equalization unit 205, the demodulation unit 206, and the decryption unit 207 to the ineffective (OFF) state. At the step 2706, the signal judgment unit 210 controls the error judgment unit 208 to the ineffective (OFF) state. At the step 2707, the signal judgment unit 210 controls the characteristic judgment unit 209 to the ineffective (OFF) state.

The radio communication unit starts a signal-reception wait state at the step 2708 once the above initial setting is completed. As a received radio signal arrives, at the step 2709, the signal power detector 201 computes the power value of the received radio signal and compares the power value with −85 dBm to determine whether the computed power value is greater or smaller than −85 dBm. If the computed power value is smaller than −85 dBm (that is, if the signal judgment unit 210 does not receive a feedback signal from the signal power detector 201), the signal judgment unit 210 continues the signal-reception wait state (goes back to the step 2708). If the computed power value is greater than −85 dBm (that is, if the signal judgment unit 210 has received a feedback signal from the signal power detector 201), the signal judgment unit 210 determines that the received radio signal serving as a recording candidate has arrived. The signal judgment unit 210 accordingly starts signal recording at the step 2710.

The signal judgment unit 210 subsequently acquires a result of an analysis of a frequency component from the frequency detector 202. Specifically, at the step 2711, the signal judgment unit 210 determines whether a feedback signal has been received from the frequency detector 202. The feedback signal is output from the frequency detector 202 if the center frequency of the received radio signal is 2,450 MHz and the bandwidth is not greater than 100 MHz.

If the result of the determination indicates inconformity, the signal judgment unit 210 stops the recording of the received radio signal at the step 2716. At the step 2717, the signal judgment unit 210 discards the signal that has been recorded till that point. If the result of the determination indicates conformity, the signal judgment unit 210 waits for signal-reception processing to be carried out by the signal-reception processing unit 105 at the step 2712. To put it concretely, the signal judgment unit 210 waits for processing such as synchronization, equalization, demodulation, and decoding.

At the step 2713, the signal judgment unit 210 determines whether the power value is greater or smaller than −85 dBm. If the power value is greater than −85 dBm, the signal judgment unit 210 continues the signal-reception processing, (that is, the signal judgment unit 210 goes back to the step 2712). If the power value is smaller than −85 dBm, meanwhile, the signal judgment unit 210 stops the signal recording at the step 2714 and saves the radio signal that has been received at the step 2715. What is described above is a sequence of processing operations carried out to record one received radio signal. The signal judgment unit 210 accordingly goes back to the signal-reception wait state of the step 2708.

The processing operations explained above are carried out on the basis of a processing determination instruction. Through the processing operations described above, only a radio signal satisfying conditions shown in FIG. 25 is selectively recorded and a radio signal not satisfying the conditions is discarded.

Sixth Embodiment

Figure 28:
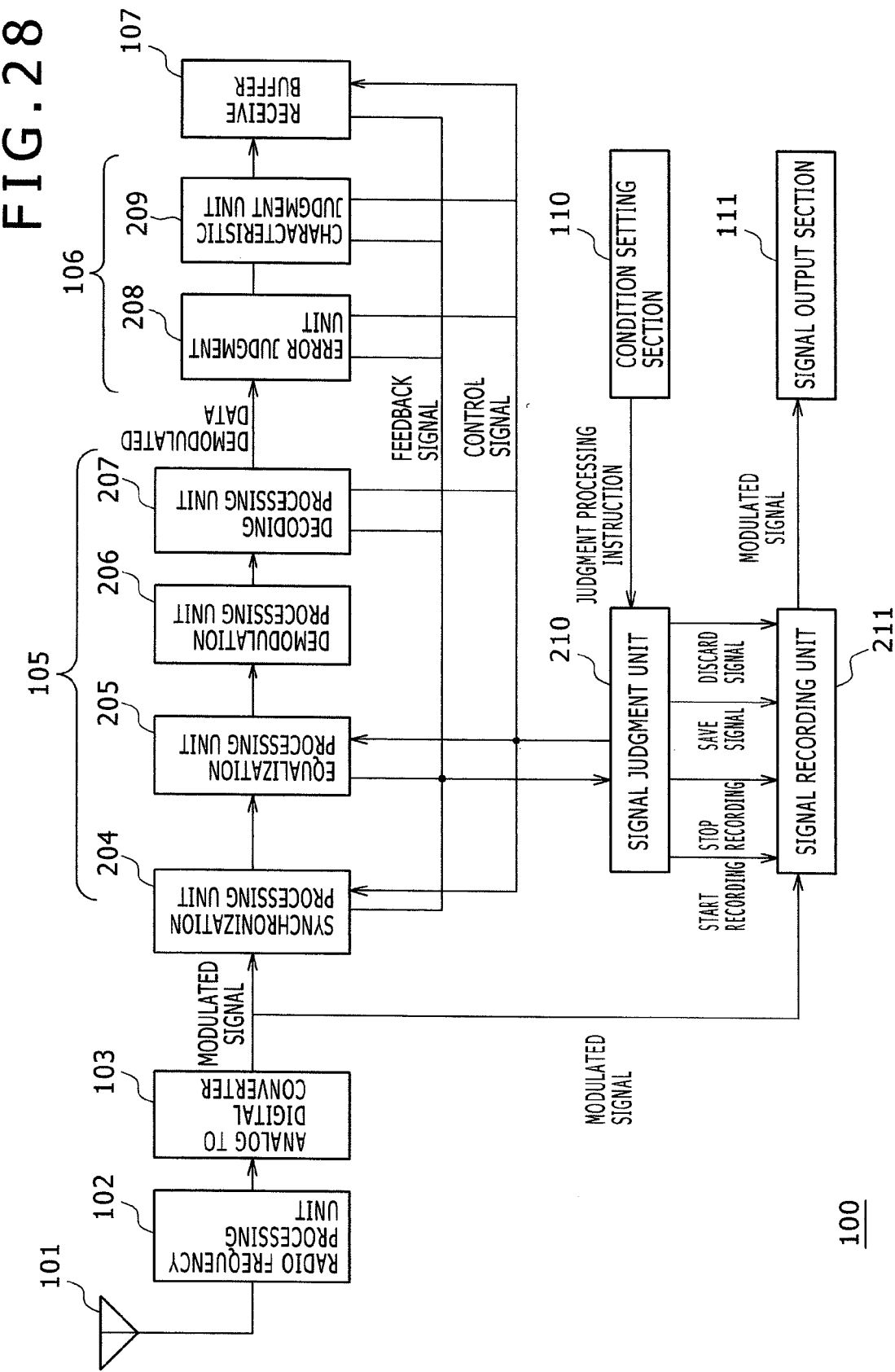
FIG. 28 is a diagram showing a typical external structure of a radio communication unit.

A sixth embodiment implements a radio communication unit having atypical structure different from that of the radio communication unit according to the first and second embodiments explained before. FIG. 28 shows an example of the entire structure of the radio communication unit 200 according to the sixth embodiment. The radio communication unit 200 is configured to include an antenna 101, a radio frequency processing unit 102, an analog to digital converter 103, a synchronization processing unit 204, a equalization unit 205, a demodulation unit 206, a decryption unit 207, an error judgment unit 208, a characteristic judgment unit 209, a decryption unit 207, a signal judgment unit 210, a signal recording unit 211, a condition setting section 110, and a signal output section 111.

In the radio communication unit having the above structure, the same functions as the signal-reception processing unit 105 in the structure shown in FIG. 1 are carried out by the synchronization processing unit 204, the equalization unit 205, the demodulation unit 206 and the decryption unit 207. If the processing carried out by the signal detector 104 is identical with or similar to the processing carried out by the synchronization processing unit 204, the equalization unit 205, the demodulation unit 206, and the decryption unit 207, it is possible to provide a structure not including the signal detector 104 as shown in FIG. 28. It is needless to say that the radio communication unit according to the sixth embodiment can also adopt an apparatus structure that has only the input/output relations shown in FIG. 28 as relations of the feedback signals in the hardware.

Seventh Embodiment

Figure 29:
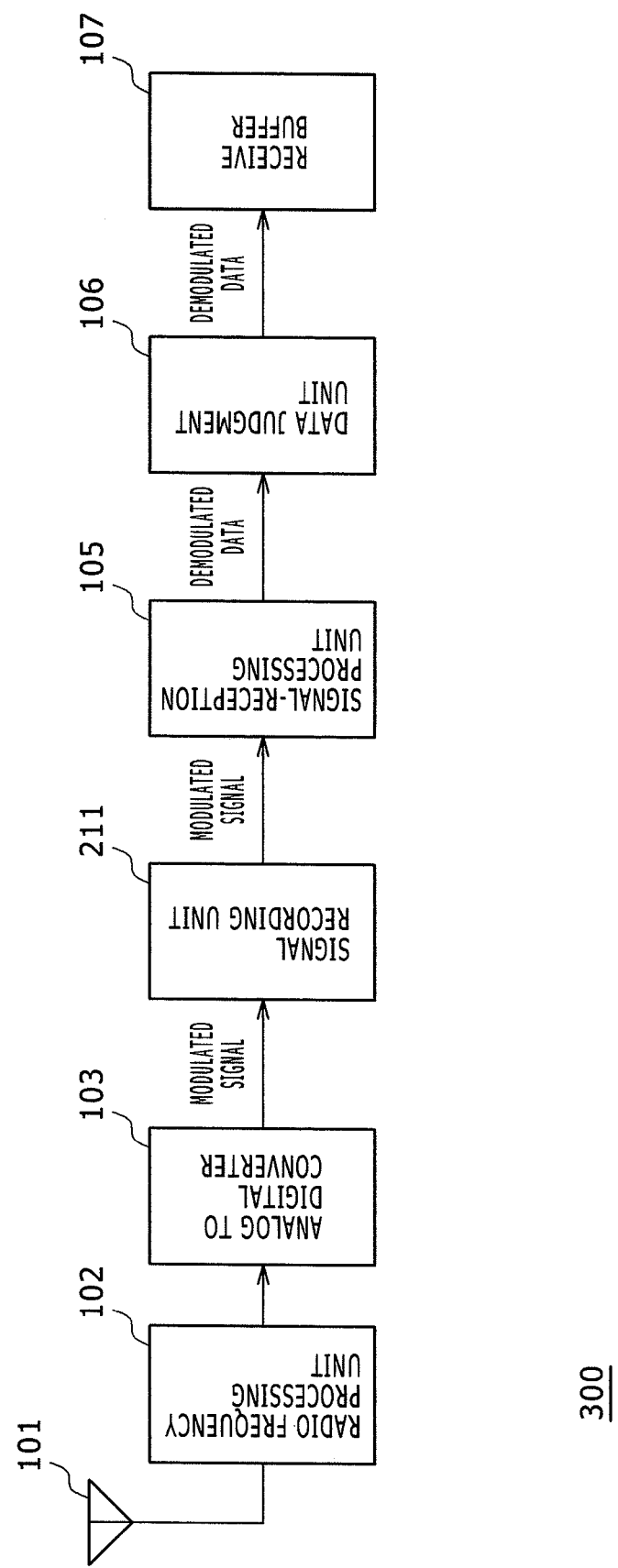
FIG. 29 is a diagram showing a typical external structure of a radio communication unit.

A seventh embodiment implements a radio communication unit having a typical structure different from that of the radio communication unit according to the first, second, and sixth embodiments explained before. FIG. 29 shows the entire structure of the radio communication unit 300 according to the seventh embodiment.

The radio communication unit 300 according to this embodiment is configured to include an antenna 101, a radio frequency processing unit 102, an analog to digital converter 103, a signal recording unit 211, a signal-reception processing unit 105, a data judgment unit 106, and a receive buffer 107. As shown in the figure, in the radio communication unit 300 according to this embodiment, the signal recording unit 211 is provided at a stage immediately following the analog to digital converter 103. The signal recording unit 211 carries out processing record a received radio signal.

The radio communication unit 300 according to this embodiment is used in equipment intended to record an entire modulated signal obtained immediately after AD conversion and to analyze the received modulated signal. It is to be noted that, in this embodiment, processing operations are carried out in accordance with a processing determination instruction in the same way as the embodiments described above. That is to say, FIG. 29 is one of equivalent diagrams of the radio communication unit 100 according to the second embodiment. It is to be noted that a radio communication unit can also adopt an apparatus structure that has only the input/output relations shown in FIG. 29 as relations of feedback signals in the hardware.

Eighth Embodiment

By the same token, in an eighth embodiment, the structure of the radio communication unit 100 implemented in the second embodiment is assumed as a premise. The description of the eighth embodiment explains a system configuration of a radio communication unit and its processing operations for a case in which concrete setting conditions are given.

FIG. 30 shows setting conditions (recording conditions) of a received radio signal to be selectively recorded and saved in the embodiment. In the setting conditions (recording conditions) shown in FIG. 30, the power detection is controlled to effective (ON) and the power threshold value is set at −100 dBm. The frequency detection is controlled to effective (ON), the center frequency of those to be detected is set at 1,575 MHz, and the bandwidth is set at 10 MHz. The correlation detection, the synchronization processing, the equalization processing, the demodulation processing, the decoding processing, the error judgment, and the characteristic determination are each set to ineffective (OFF). That is to say, this embodiment is intended to receive and record a GPS signal. If a radio signal using a license band is recorded with the use of these setting conditions, the probability that an incoming signal other than the desired one is input is low, so that the GPS signal can be recorded with relatively simple conditions setting.

Figure 31:
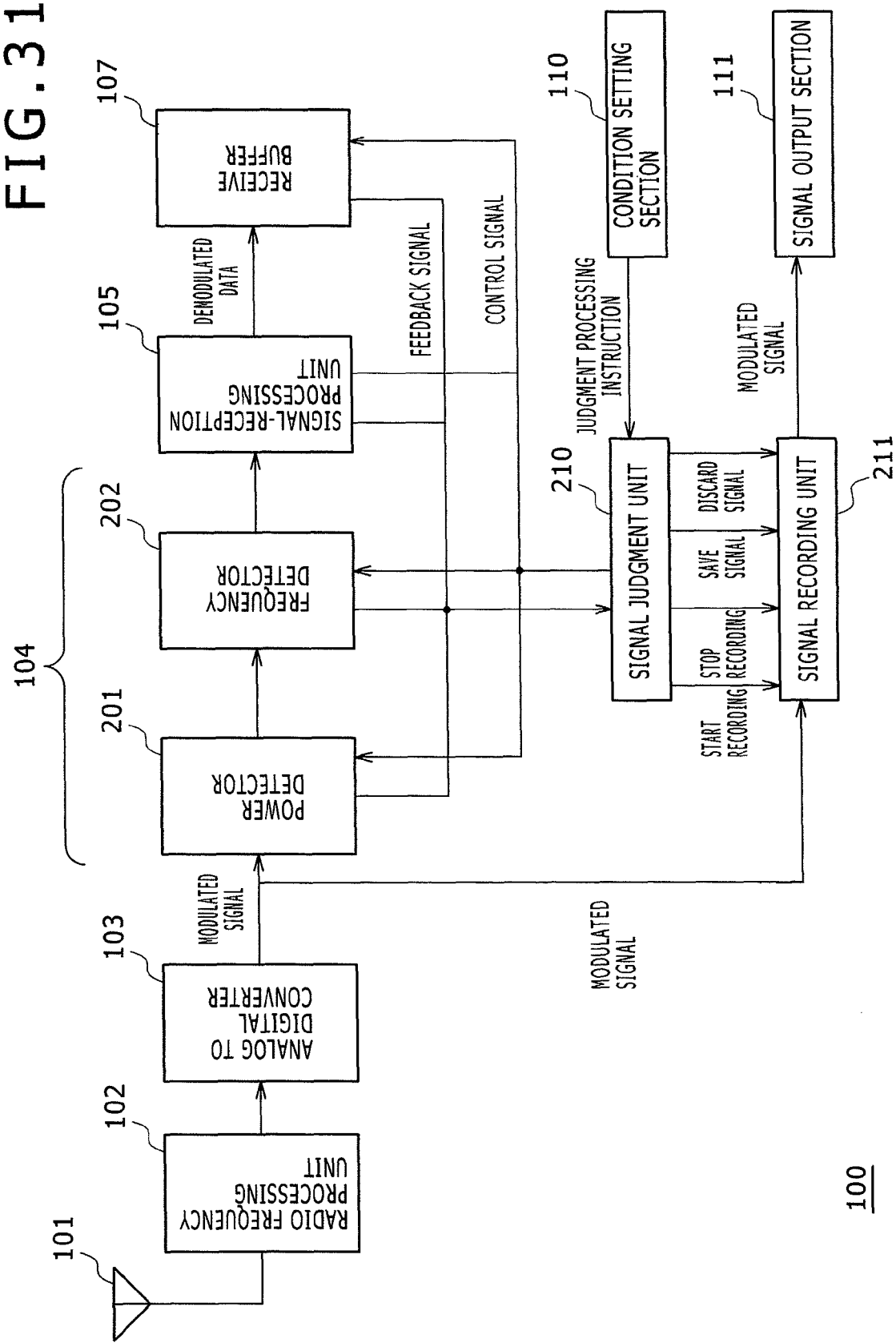
FIG. 31 is a diagram showing a typical external structure of a radio communication unit.

FIG. 31 is a diagram showing input/output relations of feedback signals used in the radio communication unit according to the eighth embodiment in such a way that the relations can be understood with ease. The radio communication unit 100 is configured to include an antenna 101, a radio frequency processing unit 102, an analog to digital converter 103, a signal power detector 201, a frequency detector 202, a signal-reception processing unit 105, a receive buffer 107, a signal judgment unit 210, a signal recording unit 211, condition setting section 110, and a signal output section 111. The effective/ineffective states and the threshold values are switched on the basis of the setting conditions shown in FIG. 30. The eighth embodiment can adopt an apparatus structure that has only the input/output relations shown in FIG. 31 as relations of the feedback signals in the hardware.

Figure 32:
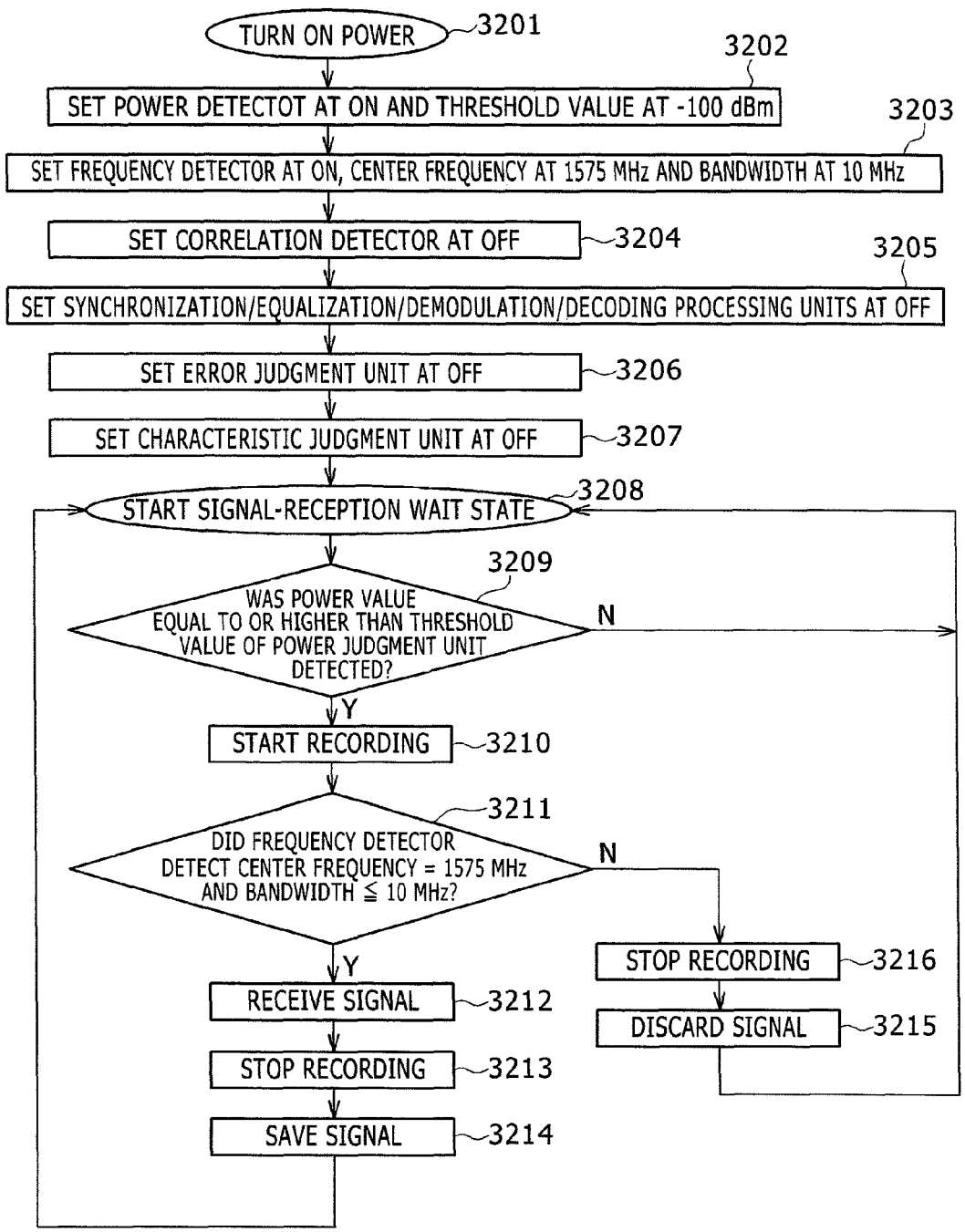
FIG. 32 is a flowchart to be referred to in explanation of typical processing operations carried out in the signal judgment unit.

FIG. 32 shows a typical processing operation procedure based on a description in a judgment processing instruction corresponding to the eighth embodiment. After the power of the radio communication unit is turned on at the step 3201, the signal judgment unit 210 controls the signal power detector 201 to the effective (ON) state and sets the threshold value at −100 dBm at the step 3202. Then, the signal judgment unit 210 controls the frequency detector 202 to the effective (ON) state, sets the center frequency of those to be detected at 1,575 MHz, and sets the bandwidth at 10 MHz at the step 3203.

At the step 3204, the signal judgment unit 210 thereafter controls the correlation detector 203 to the ineffective (OFF) state.

At the step 3205, the signal judgment unit 210 controls the synchronization processing unit 204, the equalization unit 205, the demodulation unit 206 and the decryption unit 207 to the ineffective (OFF) state. At the step 3206, the signal judgment unit 210 controls the error judgment unit 208 to the ineffective (OFF) state. Then, at the step 3207, the signal judgment unit 210 controls the characteristic judgment unit 209 to the ineffective (OFF) state.

The radio communication unit starts a signal-reception wait state at the step 3208 once the above initial setting is completed. As a received radio signal arrives, at the step 3209, the signal power detector 201 computes the power value of the received radio signal and compares the power value with −100 dBm to determine whether the computed power value is greater or smaller than −100 dBm. If the computed power value is smaller than −100 dBm (that is, if the signal judgment unit 210 does not receive a feedback signal from the signal power detector 201), the signal judgment unit 210 continues the signal-reception wait state (goes back to the step 3208). If the computed power value is greater than −100 dBm (that is, if the signal judgment unit 210 has received a feedback signal from the signal power detector 201), meanwhile, the signal judgment unit 210 determines that the received radio signal serving as a recording candidate has arrived. The signal judgment unit 210 accordingly starts signal recording at the step 3210.

The signal judgment unit 210 subsequently acquires a result of an analysis of a frequency component from the frequency detector 202. Specifically, at the step 3211, the signal judgment unit 210 determines whether a feedback signal has been received from the frequency detector 202. The feedback signal is output from the frequency detector 202 if the center frequency of the received radio signal is 1,575 MHz and the bandwidth is not greater than 10 MHz. If the result of the determination indicates inconformity, the signal judgment unit 210 stops the recording of the received radio signal at the step 3216. At the step 3215, the signal judgment unit 210 further discards the signal that has been recorded.

If the result of the determination indicates conformity, the signal judgment unit 210 waits for signal-reception processing to be carried out by the signal-reception processing unit 105 at the step 3212. To put it concretely, the signal judgment unit 210 waits for processing such as synchronization, equalization, demodulation, and decoding. The signal judgment unit 210 issues a command to stop the signal recording at the step 3213 and another command to save the radio signal received so far at the step 3214. What is described above is a sequence of processing operations carried out to record one received radio signal. The signal judgment unit 210 then goes back to the signal-reception wait state of the step 3208.

The processing operations explained above are carried out on the basis of a processing determination instruction. Through the processing operations explained above, only a radio signal satisfying conditions shown in FIG. 30 is selectively recorded and a radio signal not satisfying the conditions is discarded.

Ninth Embodiment

By the same token, the structure of the radio communication unit 100 implemented in the second embodiment is assumed as a premise. The description of the ninth embodiment explains a system configuration of a radio communication unit and its processing operations for a case in which concrete setting conditions are given.

FIG. 33 shows setting conditions (recording conditions) of a received radio signal to be selectively recorded and saved in the embodiment. In the setting conditions (recording conditions) shown in FIG. 33, the power detection is controlled to effective (ON) and the power threshold value is set at 30 dBm. The frequency detection is controlled to effective (ON), the center frequency of those to be detected is set at 435 MHz and the bandwidth is set at 10 MHz. The correlation detection, the synchronization processing, the equalization processing, the demodulation processing, the decoding processing, the error judgment and the characteristic determination are each set to ineffective (OFF). That is to say, this embodiment is intended to record a signal transmitted at an illegally large output. In other words, this embodiment is capable of carrying out processing to select only a signal having a large output clearly considered to be abnormal and to record the selected signal.

A typical entire structure of the radio communication unit according to the ninth embodiment is identical with that shown in FIG. 31.

FIG. 34 shows a typical processing operation procedure based on a description in a judgment processing instruction corresponding to the ninth embodiment. After the power of the radio communication unit is turned on at the step 3401, the signal judgment unit 210 controls the signal power detector 201 to the effective (ON) state and sets the threshold value at 30 dBm at the step 3402. Then, the signal judgment unit 210 controls the frequency detector 202 to the effective (ON) state, sets the center frequency of those to be detected at 435 MHz, and sets the bandwidth at 10 MHz at the step 3403.

At the step 3404, the signal judgment unit 210 controls the correlation detector 203 to the ineffective (OFF) state. At the step 3405, the signal judgment unit 210 controls the synchronization processing unit 204, the equalization unit 205, the demodulation unit 206, and the decryption unit 207 to the ineffective (OFF) state. At the step 3406, the signal judgment unit 210 controls the error judgment unit 208 to the ineffective (OFF) state. At the step 3407, the signal judgment unit 210 controls the characteristic judgment unit 209 to the ineffective (OFF) state.

The radio communication unit starts a signal-reception wait state at the step 3408 once the above initial setting is completed. As a received radio signal arrives, at the step 3409, the signal power detector 201 computes the power value of the received radio signal and compares the power value with 30 dBm to determine, whether the computed power value is greater or smaller than 30 dBm. If the computed power value is smaller than 30 dBm (that is, if the signal judgment unit 210 does not receive a feedback signal from the signal power detector 201), the signal judgment unit 210 continues the signal-reception wait state (goes back to the step 3408). If the computed power value is greater than 30 dBm (that is, if the signal judgment unit 210 has received a feedback signal from the signal power detector 201), meanwhile, the signal judgment unit 210 determines that the received radio signal serving as a recording candidate has arrived. The signal judgment unit 210 accordingly starts signal recording at the step 3410.

The signal judgment unit 210 subsequently acquires a result of an analysis of a frequency component from the frequency detector 202. Specifically, at the step 3411, the signal judgment unit 210 determines whether a feedback signal has been received from the frequency detector 202. The feedback signal is output by the frequency detector 202 if the center frequency of the received radio signal is 435 MHz and the bandwidth is not greater than 10 MHz.

If the result of the determination indicates inconformity, the signal judgment unit 210 stops the recording of the received radio signal at the step 3416. At the step 3415, the signal judgment unit 210 further discards the signal that has been recorded. If the result of the determination indicates conformity, the signal judgment unit 210 waits for signal-reception processing to be carried out by the signal-reception processing unit 105 at the step 3412. To put it concretely, the signal judgment unit 210 waits for processing such as synchronization, equalization, demodulation, and decoding. The signal judgment unit 210 subsequently issues a command to stop the signal recording at the step 3413 and save the radio signal at the step 3414. What is described above is a sequence of processing operations for recording one received radio signal. The signal judgment unit 210 goes back to the signal-reception wait state of the step 3408. Through the processing operations explained above, only a radio signal satisfying conditions shown in FIG. 34 is selectively recorded and a radio signal not satisfying the conditions is discarded.

REFERENCE NUMERALS

100: Radio communication unit
101: Antenna
102: Radio frequency processing unit
103: Analog to digital converter
104: Signal detector
105: Signal-reception processing unit 106: Data judgment unit
107: Receive buffer
108: Signal judgment unit
109: Signal recording unit
110: Condition setting section
111: Signal output section
200: Radio communication unit
201: Signal power detector
202: Frequency detector
203: Correlation detector
204: Synchronization processing unit
205: Equalization unit
206: Demodulation unit
207: Decryption unit
208: Error judgment unit
209: Characteristic judgment unit
210: Signal judgment unit
211: Signal recording unit
300: Radio communication unit
301: Power converter
302: Power judgment unit
401: Frequency converter
402: Frequency judgment unit
501: Correlation processing unit
502: Correlation judgment unit
601: Carrier synchronization unit
602: Symbol synchronization unit
603: Frame synchronization unit
701: Channel inference unit
702: Channel equalization unit
801: Demodulation unit
901: Decryption unit
1001: Error detection processing unit
1002: Error judgment unit
1101: Characteristic detector
1102: Characteristic judgment unit
1201: Signal judgment unit
1301: Signal-recording control unit
1302: Memory
1601: Display apparatus
1701: External output unit

The invention claimed is:

1. A radio communication unit comprising:
a signal detector for detecting a feature quantity of a received radio signal;
a signal-reception processing unit for inputting a received radio signal before being input to the signal detector or a received radio signal output from the signal detector to demodulate the received radio signal;
a data judgment unit for determining whether a received radio signal demodulated by the signal-reception processing unit is correct or incorrect and/or for determining a characteristic of the received radio signal demodulated by the signal-reception processing unit;
a condition setting section for inputting a recording condition of the received radio signal; and
a signal judgment unit for:
inputting a feedback signal from the signal detector, the signal-reception processing unit, and the data judgment unit;
using at least a part of the feedback signal to determine whether the received radio signal conforms to a recording condition; and
controlling a received radio signal prior to signal processing to be recorded into a signal recording unit on a basis of a result of the determination.

2. A radio communication unit according to claim 1 wherein, the condition setting section generates a judgment processing instruction describing an operating condition of the signal detector, the signal-reception processing unit, and the data judgment unit, as well as an operating condition of the signal judgment unit, on the basis of the recording condition.

3. A radio communication unit according to claim 1, wherein the received radio signal recorded into the signal recording unit is a received radio signal supplied to the signal detector.

4. A radio communication unit according to claim 1, wherein the signal judgment unit issues a command to the signal recording unit to start recording of the received radio signal, stop recording of the received radio signal, save the received radio signal, and discard the received radio signal.

5. A radio communication unit according to claim 1, wherein the signal detector includes at least a part of following units:
a signal power detector for detecting a power value of the received radio signal;
a frequency detector for detecting a frequency component of the received radio signal; and
a correlation detector for detecting a correlation value of the received radio signal.

6. A radio communication unit according to claim 5, wherein:
the signal judgment unit individually sets execution ON/OFF status of the correlation detector and operating mode of the correlation detector and individually sets a judgment threshold value of the signal power detector and the frequency detector; and
the signal power detector, the frequency detector, and the correlation detector output a judgment result of the respective detectors to the signal judgment unit as the feedback signal.

7. A radio communication unit according to claim 1, wherein the signal-reception processing unit includes at least a part of following units:
a synchronization processing unit for carrying out synchronization processing on the received radio signal;
an equalization unit for carrying out equalization processing on the received radio signal;
a demodulation unit for carrying out demodulation processing on the received radio signal; and
a decryption unit for carrying out decoding processing on the received radio signal.

8. A radio communication unit according to claim 7, wherein
the signal judgment unit sets the execution ON/OFF status of the synchronization processing unit, the equalization unit, the demodulation unit, and the decryption unit and individually sets a judgment threshold value of the equalization unit, the demodulation unit, and the decryption unit, and
the synchronization processing unit, the equalization unit, the demodulation unit, and the decryption unit output a judgment result, obtained at a time when an operation of the respective units is ON, to the signal judgment unit as the feedback signal.

9. A radio communication unit according to claim 1, wherein the data judgment unit includes at least a part of following units:
an error judgment unit for determining whether the received radio signal is correct or incorrect; and
a characteristic judgment unit for determining the characteristic of the received radio signal.

10. A radio communication unit according to claim 9, wherein:

the signal judgment unit individually sets an execution ON/OFF status of the error judgment unit and the characteristic judgment unit and individually sets a judgment threshold value of the error judgment unit and the characteristic judgment unit; and the error judgment unit and the characteristic judgment unit output a judgment result, obtained at a time when an operation of the respective units is ON, to the signal judgment unit as the feedback signal.

11. A radio communication unit comprising:

a signal-reception processing unit for demodulating a received radio signal;

a data judgment unit for determining whether the received radio signal demodulated by the signal-reception processing unit is correct or incorrect and determining a characteristic of the received radio signal demodulated by the signal-reception processing unit;

a condition setting section for inputting a recording condition of the received radio signal; and a signal judgment unit for:

inputting a feedback signal from the signal-reception processing unit and the data judgment unit;

using the feedback signal to determine whether a received radio signal conforms to the recording condition; and controlling a received radio signal prior to signal processing to be recorded into a signal recording unit on the basis of a result of the determination.

12. A radio communication unit comprising:

a signal detector for detecting a feature quantity of a received radio signal;

a signal-reception processing unit for inputting a received radio signal before being input to the signal detector or a received radio signal output from the signal detector to demodulate the received radio signal;

a condition setting section for inputting a recording condition of a received radio signal; and a signal judgment unit for:

inputting a feedback signal from the signal detector and the signal-reception processing unit;

using at least a part of the feedback signal to determine whether a received radio signal conforms to the recording condition; and controlling a received radio signal prior to signal processing to be recorded into a signal recording unit on the basis of a result of the determination.

13. A radio communication unit comprising:

a signal recording unit for recording a received radio signal;

a signal-reception processing unit for demodulating the received radio signal;

a data judgment unit for determining whether a received radio signal demodulated by the signal-reception processing unit is correct or incorrect and/or for determining a characteristic of the received radio signal demodulated by the signal-reception processing unit;

a condition setting section for inputting a recording condition of a received radio signal; and a signal judgment unit for:

inputting a feedback signal from the signal-reception processing unit and the data judgment unit;

using at least a part of the a feedback signal to determine whether a received radio signal conforms to the recording condition; and controlling a received radio signal prior to signal processing to be recorded into the signal recording unit on the basis of a result of the determination.

14. A signal processing unit comprising:

a condition setting section for inputting a recording condition of a received radio signal;

a signal detector for detecting a feature, quantity of a received radio signal;

a signal-reception processing unit for inputting a received radio signal before being input to the signal detector or a received radio signal output from the signal detector to modulating the received radio signal; and a signal judgment unit for:

inputting a feedback signal from a data judgment unit for determining whether a received radio signal modulated by the signal-reception processing unit is correct or incorrect and/or determining the characteristic of the received radio signal;

using at least a part of the a feedback signal to determine whether a received radio signal conforms to a recording condition; and controlling an operation to record a received radio signal prior to signal processing into a signal recording unit on the basis of a result of the determination.

\* \* \* \* \*